United States Patent
Hampel et al.

(10) Patent No.: US 10,470,018 B2
(45) Date of Patent: Nov. 5, 2019

(54) DATA AGGREGATION AND DELIVERY

(71) Applicant: QUALCOMM Incorporated, San Diego, CA (US)

(72) Inventors: Karl Georg Hampel, New York, NY (US); Vincent Douglas Park, Budd Lake, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 14/693,433

(22) Filed: Apr. 22, 2015

(65) Prior Publication Data

US 2016/0119738 A1 Apr. 28, 2016

Related U.S. Application Data

(60) Provisional application No. 62/068,525, filed on Oct. 24, 2014.

(51) Int. Cl.
| | |
|---|---|
| *H04W 4/70* | (2018.01) |
| *H04W 8/00* | (2009.01) |
| *H04W 72/04* | (2009.01) |
| *H04W 76/14* | (2018.01) |
| *H04W 76/11* | (2018.01) |
| *H04W 88/04* | (2009.01) |
| *H04W 88/08* | (2009.01) |

(52) U.S. Cl.
CPC ............ *H04W 4/70* (2018.02); *H04W 8/005* (2013.01); *H04W 72/0446* (2013.01); *H04W 72/0453* (2013.01); *H04W 76/11* (2018.02); *H04W 76/14* (2018.02); *H04W 88/04* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 9,014,104 B2 | 4/2015 | Li et al. | |
| 2011/0182262 A1* | 7/2011 | Patel | H04B 7/2656 370/329 |
| 2012/0004003 A1 | 1/2012 | Shaheen et al. | |

(Continued)

FOREIGN PATENT DOCUMENTS

| | | |
|---|---|---|
| EP | 2369883 A1 | 9/2011 |
| JP | 2015534366 A | 11/2015 |

(Continued)

OTHER PUBLICATIONS

International Search Report and Written Opinion—PCT/US2015/052011—ISA/EPO—dated Dec. 3, 2015.

(Continued)

*Primary Examiner* — Chi H Pham
*Assistant Examiner* — Raul Rivas
(74) *Attorney, Agent, or Firm* — Loza & Loza, LLP

(57) ABSTRACT

Data received from multiple devices (e.g., machine-to-machine devices, machine type communication devices, and so on) is aggregated and delivered to another device (e.g., a base station). In this way, the data is efficiently transmitted to the other device, for example, in scenarios where the devices that source the data have limited transmission capabilities.

30 Claims, 18 Drawing Sheets

(56) References Cited

U.S. PATENT DOCUMENTS

| | | | |
|---|---|---|---|
| 2014/0342747 A1* | 11/2014 | Lee | H04L 5/0053 455/450 |
| 2015/0172387 A1 | 6/2015 | Ge et al. | |
| 2015/0172846 A1 | 6/2015 | Ge et al. | |
| 2015/0195823 A1 | 7/2015 | Seo et al. | |

FOREIGN PATENT DOCUMENTS

| | | |
|---|---|---|
| WO | 2010053688 A1 | 5/2010 |
| WO | 2011158688 A1 | 12/2011 |
| WO | WO-2014010996 A1 | 1/2014 |
| WO | WO-2014051373 A1 | 4/2014 |

OTHER PUBLICATIONS

Coolpad: "Initial Views on 5G Technologies—from Terminal Perspectives", 3GPP workshop Sep. 17, 2015_18_RAN_5G RWS-150069, Internet: http://www.3gpp.org/ftp/workshop/2015-09-17_18_RAN_5G/Docs/RWS-150069.zip>, 15 pages.

ETRI: "5G Vision and Enabling Technologies: ETRI Perspective", 3GPP workshop Sep. 17, 2015_18_RAN_5G RWS-150029, Sep. 3, 2015, Internet: http://www.3gpp.org/ftp/workshop/2015-09-17_18_RAN_5G/Docs/RWS-150029.zip>, 19 pages.

* cited by examiner

DATA AGGREGATION AND DELIVERY

CROSS-REFERENCE TO RELATED APPLICATION(S)

This application claims priority to and the benefit of provisional patent application No. 62/068,525 filed in the U.S. patent office on Oct. 24, 2014, the entire content of which is incorporated herein by reference.

BACKGROUND

Field of the Disclosure

Aspects of the disclosure relate generally to wireless communication, and more specifically, but not exclusively, to aggregating data from a plurality of devices and delivering the aggregated data to another device.

Description of Related Art

Machine-to-machine (M2M) communication or machine type communication (MTC) refers to data communication technologies that allow automated devices to communicate with one another without human intervention. For example, M2M and/or MTC may refer to communication from devices that integrate sensors or meters to measure or capture information and relay that information to a central server or application program that can make use of the information or present the information to humans interacting with the program or application. These devices may be called M2M devices, MTC devices and/or MTC user equipments (UEs). For convenience, these devices may simply be referred to as MTC devices in the discussion that follows.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. The market for MTC devices is expected to grow rapidly as industries such as automotive, security, healthcare, and fleet management employ MTC to increase productivity, manage costs, and/or expand customer services.

MTC devices may use a variety of wired and/or wireless communication technologies. For example, MTC devices may communicate with a network over various wide area network (WAN) technologies, such as 3GPP Long Term Evolution (LTE), and/or over various local area network (LAN) technologies (e.g., IEEE 802.11 (Wi-Fi), IEEE 802.16 (WiMAX), etc.). MTC devices may also communicate with one another using various peer-to-peer technologies such as LTE-Direct (LTE-D), Bluetooth, ZigBee, and/or other ad-hoc or mesh network technologies. The expansion of multiple access wireless networks around the world has made it far easier for MTC communication to take place and has lessened the amount of power and time for information to be communicated between machines.

Typically, MTC devices are power efficient and low-cost. Therefore, these devices might be equipped with a radiofrequency (RF) amplifier that has relatively limited radiofrequency (RF) transmit power. Also, MTC devices may employ a transceiver that communicates via a relatively narrow frequency band (e.g., relative to the frequency band used for a WAN). As a result, MTC devices may have link budget challenges, particularly for up-link communication to a base station (e.g., an enhanced Node B (eNB)).

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

A device such as an Internet of Everything (IOE) device (e.g., an MTC device such as a sensor device) may, at some point in time, need to send a data message to a server. In scenarios where the device is a low power device, the device might have downlink (DL) WAN coverage, but no (or minimal) uplink (UL) WAN coverage. For such scenarios, U.S. patent application Ser. Nos. 14/107,195 and 14/107,221 disclose solutions where the low power device opportunistically finds a nearby device (e.g., a user equipment (UE)) via a device-to-device (D2D) discovery mechanism and uses this nearby device as a relay to deliver the data message to the WAN and, ultimately, to the server. The WAN subsequently sends a delivery confirmation directly to the low power device, or to the low power device via the UE.

In the presence of a large number of IOE devices, this procedure could be relatively inefficient for the UE and the network. For example, each delivery of an IOE message may involve setup and tear-down of a UE-to-WAN connection (e.g., setting up bearers, performing authentication, then tearing down the bearers, etc.).

The disclosure relates in some aspects to receiving data from multiple devices (e.g., IOE devices, M2M devices, MTC devices, and so on), aggregating the received data, and delivering the aggregated data to another device (e.g., a base station). In this way, the data is efficiently transmitted to the other device, for example, in scenarios where the devices that source the data have limited transmission capabilities.

In one aspect, the disclosure provides an apparatus configured for communication that includes a memory device and a processing circuit coupled to the memory device. The processing circuit is configured to: receive a plurality of discovery signals from a plurality of first devices; send a page to each of the first devices as a result of the receipt of the discovery signals; receive data from each of the first devices; aggregate the data received from each of the first devices; and send the aggregated data to a second device.

Another aspect of the disclosure provides a method of communication. The method includes: receiving a plurality of discovery signals from a plurality of first devices; sending a page to each of the first devices as a result of the receipt of the discovery signals; receiving data from each of the first devices; aggregating the data received from each of the first devices; and sending the aggregated data to a second device.

Another aspect of the disclosure provides an apparatus configured for communication. The apparatus including: means for receiving a plurality of discovery signals from a plurality of first devices; means for sending a page to each of the first devices as a result of the receipt of the discovery signals; wherein the means for receiving is configured to receive data from each of the first devices; means for aggregating the data received from each of the first devices; and means for sending the aggregated data to a second device.

Another aspect of the disclosure provides a non-transitory computer-readable medium storing computer-executable code, including code to: receive a plurality of discovery signals from a plurality of first devices; send a page to each of the first devices as a result of receiving the discovery signals; receive data from each of the first devices; aggregate the data received from each of the first devices; and send the aggregated data to a second device.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In some scenarios, an MTC device, an M2M device, an IOE device, a sensor, or some other device (which may be referred to herein, for convenience, as an MTC device), has downlink reachability from a WAN, but does not have enough RF transmission power to reach the WAN on the uplink. Such a device may be mobile or stationary.

The MTC device can send data to a server via the WAN by opportunistically using a UE as a relay as disclosed in U.S. patent application Ser. Nos. 14/107,195 and 14/107,221, the entirety of each of which is incorporated by reference herein. The MTC device may find the UE via a narrowband D2D discovery mechanism and establish a connection to the UE, while the UE establishes a connection to the WAN (e.g., via a base station such as an LTE eNB). In this manner, the MTC device can communicate with the WAN via the UE relay, authenticate itself to the WAN, deliver the data message to the server, and receive a confirmation from the server. To this end, the MTC device may be time-synchronized with the WAN, and may periodically wake up to use one or more channels (e.g., a discovery channel, a paging channel, a traffic channel, and an acknowledgement channel) defined for the WAN.

Figure 1:
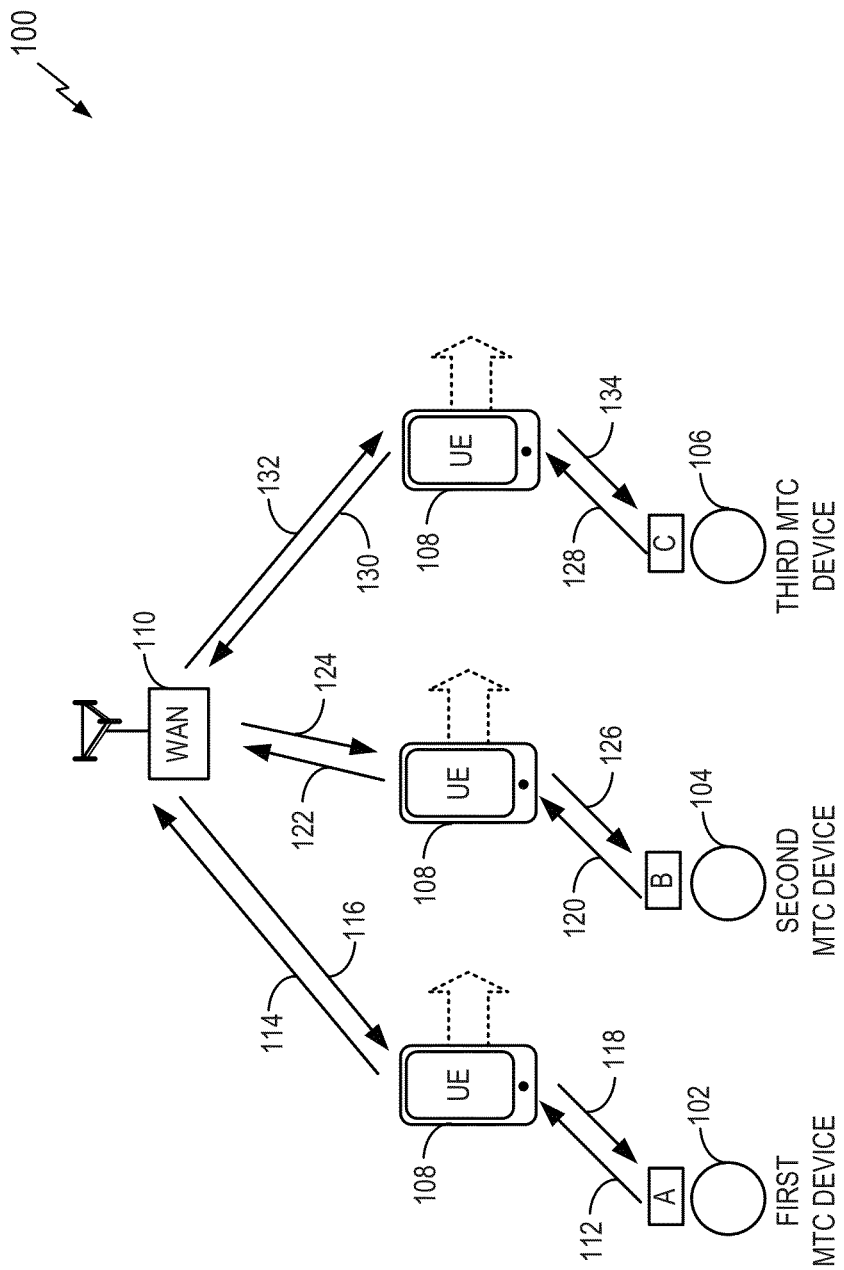
FIG. 1 illustrates an example of a communication network where a relay device relays data from several devices to another device.

FIG. 1 illustrates a communication system 100 that employs such a relay scheme. Here, a first MTC device 102, a second MTC device 104, and a third MTC device 106 use a UE 108 to sequentially upload data messages to a WAN 110. As indicated by the dashed arrows, the UE 108 is moving from left to right from the view of FIG. 1.

Initially, the first MTC device 102 uploads a data message A to the WAN 110 via the UE 108. Here, the UE 108 establishes a connection with the WAN 110, thereby enabling the first MTC device 102 to send data to the WAN via uplink communication (represented by a first set of lines 112 and 114) and receive responses via downlink communication (represented by a second set of lines 116 and 118). After the data transfer completes, the UE 108 may tear down the connection to the WAN 110 (e.g., to conserve resources).

Subsequently (e.g., after the UE 108 moves), the second MTC device 104 uploads a data message B to the WAN 110 via the UE 108. Again, the UE 108 establishes a connection with the WAN 110, thereby enabling the second MTC device 104 to send data to the WAN via uplink communication (represented by a third set of lines 120 and 122) and receive responses via downlink communication (represented by a fourth set of lines 124 and 126). After the data transfer completes, the UE 108 may tear down the connection to the WAN 110.

Then (e.g., after the UE 108 moves again), the third MTC device 106 uploads a data message C to the WAN 110 via the UE 108. The UE 108 establishes a connection with the WAN 110, thereby enabling the third MTC device 106 to send data to the WAN via uplink communication (represented by a fifth set of lines 128 and 130) and receive responses via downlink communication (represented by a sixth set of lines 132 and 134). After this data transfer completes, the UE 108 may tear down the connection to the WAN 110.

The scheme of FIG. 1 works well, particularly when the number of data deliveries via the UE is relatively small. This scheme could experience scalability problems if there is a high density of sensors, however, since the UE and the WAN may establish a connection for every relaying operation. Thus, given that the amount of data sent every time may be relatively small, this scheme may have high overhead under these conditions.

The disclosure relates in some aspects to aggregating data received from multiple devices (e.g., MTC devices, etc.), and delivering the aggregated data to another device (e.g., a base station). In this way, the above-mentioned scalability problem may be overcome.

Figure 2:
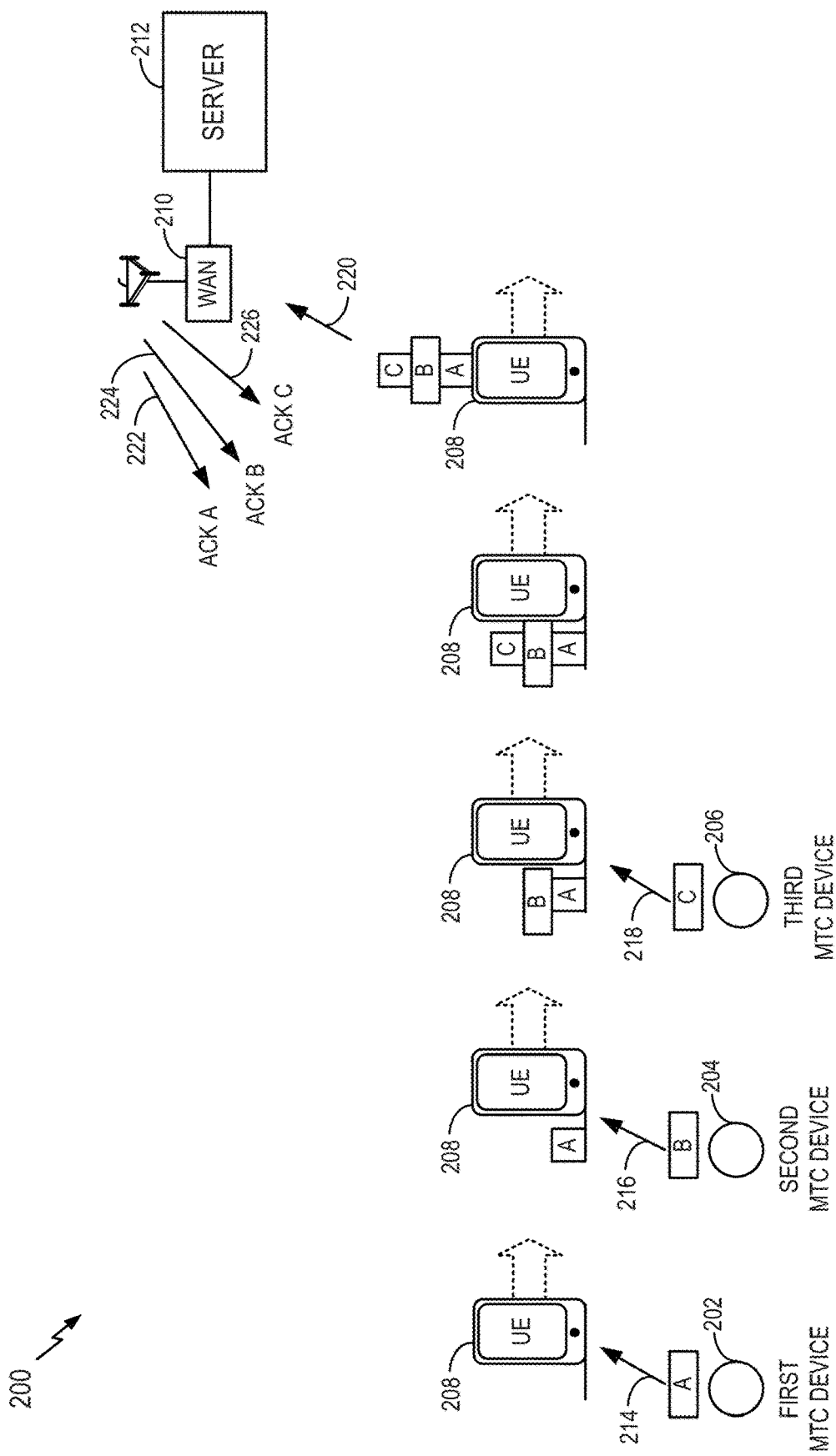
FIG. 2 illustrates an example of a communication network where data from several devices is aggregated and uploaded in accordance with some aspects of the disclosure.

FIG. 2 illustrates a communication network 200 that employs an aggregation scheme in accordance with the teachings herein. The network 200 can be implemented according to various network technologies including, without limitation, fifth generation (5G) technology, fourth generation (4G) technology, third generation (3G) technology, and other network architectures. Thus, various aspects of the disclosure may be extended to networks based on Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In FIG. 2, a first MTC device 202, a second MTC device 204, and a third MTC device 206 use a UE 208 to upload data messages to a WAN 210 (e.g., for delivery to a server 212). As indicated by the dashed arrows, the UE 208 is moving from left to right from the view of FIG. 1.

Initially, the first MTC device 202 sends a data message A to the UE 208 as represented by a line 214. The UE 208 caches the data message A as indicated in FIG. 2.

Subsequently (e.g., after the UE 208 moves), the second MTC device 204 sends a data message B to the UE 208 as represented by a line 216. The UE 208 caches the data message B as indicated.

Next (e.g., after the UE 208 again moves), the third MTC device 206 sends a data message C to the UE 208 as represented by a line 218. The UE 208 again caches the data message C as indicated.

At some later point in time, the UE 208 uploads all of the data messages (e.g., in aggregate) to the WAN 210 as represented by a line 220. The WAN 210 confirms data delivery to the UE and/or to the first MTC device 202, the second MTC device 204, and the third MTC device 206. For example, the WAN 210 may send individual acknowledgement (ACK) messages ACK A 222, ACK B 224, and ACK C 226 to the first MTC device 202, the second MTC device 204, and the third MTC device 206, respectively (e.g., via broadcast messages). As another example, the WAN 210 may broadcast a group acknowledgement (e.g., including ACK A, ACK B, and ACK C). As yet another example, the WAN 210 may send an ACK message to the UE 208 for forwarding to the first MTC device 202, the second MTC device 204, and the third MTC device 206.

Figure 3:
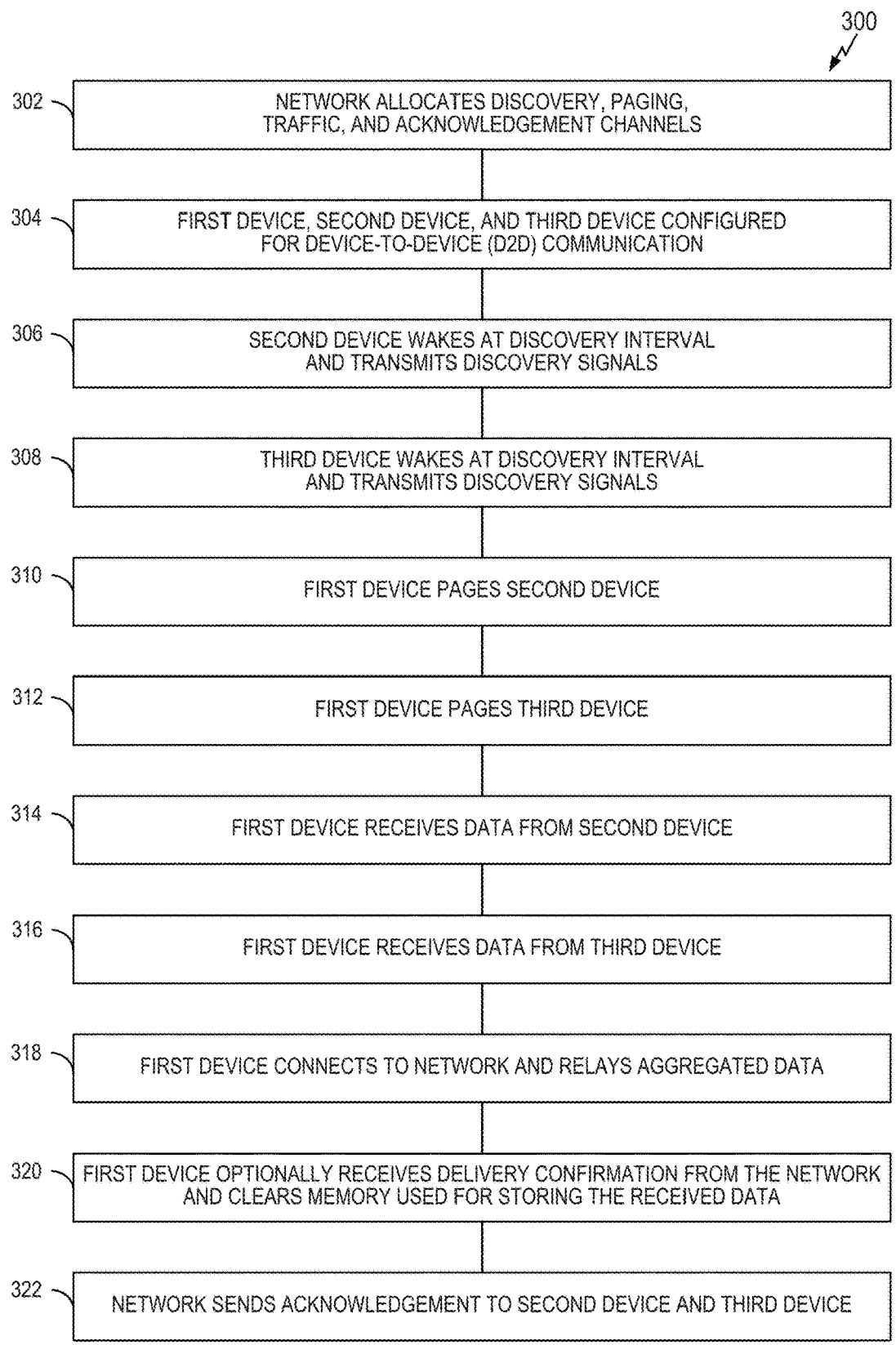
FIG. 3 illustrates an example of a process relating to data aggregation and delivery in accordance with some aspects of the disclosure.

With the above in mind, FIG. 3 illustrates an example of a process 300 for aggregation-based communication in accordance with some aspects of the disclosure. The process 300 may be implemented by any suitable apparatuses capable of supporting communication-related operations. As one example, a relay device (e.g., a UE) may receive and cache messages from multiple devices (e.g., IOE devices, etc.). When a trigger condition occurs (e.g., when the amount of cached messages becomes sufficiently large), the relay device may connect to a WAN and deliver all of the messages together. The WAN may then send a confirmation directly to the devices (e.g., the IOE devices, etc.) via a broadcast message.

At block 302, a network (e.g., a WAN) allocates discovery channels, paging channels, traffic channels, and acknowledgement channels for D2D communication. For example, the network may allocate certain time slots with particular frequency bands (e.g., relatively narrow bands) for the D2D communication.

At block 304, a first device (e.g., a relay such as a UE), a second device (e.g., an MTC device), and a third device (e.g., an MTC device) are configured for D2D communication. For example, each of these devices may be configured to communicate on the frequency bands and/or time slots allocated at block 302.

At block 306, the second device wakes (e.g., transitions from a low power sleep mode to a higher level operating mode) at a discovery interval and transmits discovery signals on the discovery channel (e.g., on specified time slots). The first device is thus able to discover the presence of the second device by monitoring the discovery channel at the appropriate time.

At block 308, the third device wakes (e.g., transitions from a low power sleep mode to a higher level operating mode) at a discovery interval and transmits discovery signals on the discovery channel (e.g., on specified time slots). The first device can thus discover the presence of the third device by monitoring the discovery channel at the appropriate time.

For example, an MTC device such as a sensor may find a UE via a discovery mechanism (e.g., as described herein and/or in U.S. patent application Ser. Nos. 14/107,195 and 14/107,221) that uses a discovery time slot allocated by a WAN. During this time slot, the UE listens to the discovery channel. MTC devices, which are synchronized to the WAN, may wake up during this time slot and broadcast a discovery signal. This procedure can occur multiple times with multiple MTC devices sending discovery signals to the UE.

At block 310, as a result of discovering the second device at block 306, the first device pages the second device on a paging channel (e.g., on specified time slots). In this way, the first device can solicit any data messages that the second device needs to upload to the WAN.

At block 312, as a result of discovering the third device at block 308, the first device pages the third device on a paging channel (e.g., on specified time slots). The first device can thus solicit any data messages that the third device needs to upload to the WAN.

For example, when a UE discovers an MTC device in a discovery time slot, the UE may send a paging message (signal) to the MTC device. To ensure that a low power MTC device (e.g., a sensor with low power consumption and/or low RF transmit power) receives the page, a paging time slot may be pre-allocated by the WAN with respect to the discovery time slot. This procedure can occur multiple times with the UE paging multiple discovered MTC devices.

At block 314, the first device receives data from the second device and stores the data. For example, as a result of receiving a page message at block 310, the second device may transmit a data message on a traffic channel (e.g., on specified time slots).

At block 316, the first device receives data from the third device and stores the data. For example, as a result of receiving a page message at block 312, the third device may transmit a data message on a traffic channel (e.g., on specified time slots).

As an example of the above, when an MTC device receives a page in a paging time slot, the MTC device may forward its data message to the UE. For this purpose, a traffic time slot may be allocated following the paging time slot. The UE then caches the received data message. This procedure can occur multiple times with multiple MTC devices uploading their data messages to the UE.

At block 318, at some point in time, the first device connects to the network and relays the aggregated data from the first and second devices. As discussed in more detail below, the UE may connect to the network if a trigger condition is met.

For example, this step may be triggered by a multitude of events including, without limitation, a periodic timer, an excess of cache used for MTC device messages, an excess of messages cached, or the establishment of a traffic connection between a UE and an enhanced Node B (eNB) (or some other form of base station) for other reasons. Continuing with the above examples, once the trigger condition is met, the UE connects to an eNB and forwards the cached data message received from the MTC devices to the eNB.

At block 320, the first device optionally receives a delivery confirmation from the network. The first device may then clear the cache memory used for storing the first and second data message. For example, upon delivery of data messages to an eNB, a UE may receive a delivery confirmation that triggers the UE to clear its cache.

At block 322, the network sends an acknowledgement to each of the second device and the third device. For example, an eNB may confirm message delivery via a broadcast message during a dedicated time slot. These confirmation messages can thus be received by MTC devices.

The confirmation message(s) may take various forms. As one example, the network may send a corresponding dedicated message to each device (i.e., one message for the second device and another message for the third device). As another example, the network may send a single message that contains an acknowledgement for the second device and an acknowledgement for the third device. As yet another example, the network may send a group acknowledgement that serves to confirm delivery of the data messages from all of the devices.

When an MTC device does not need to send data, the MTC device may elect to be active only during the discovery time slot, the paging time slot, and the confirmation time slot. During the discovery time slot, the MTC device may elect to be active only for the time of discovery signal transmission. The wake time during the paging time slot can further be reduced by introducing a fixed spacing between the discovery signal transmission and the page transmission.

Time slots or other resources (e.g., frequency bands) used for communication between an MTC device and a relay device may be defined in various ways. In some implementations, these resources are specified by the network. For example, a base station or some other network entity may specify the resources to be used for discovery, paging, data transmission, acknowledgement, and so on. As another example, these resources may be defined in a distributed manner (e.g., via negotiation between devices that will use the resources). In some scenarios, orthogonal resources (e.g., with respect to other communication in a cell) may be specified for D2D communication. For example, different time slots may be allocated for discovery, paging, data transmission, etc., and/or different frequency bands may be allocated for discovery, paging, data transmission, etc. Also, orthogonal resources may be allocated for communication by different devices. For example, different time slots and/or different frequency bands may be allocated for communication among different pairs of devices. In some implementations, the resources may be grouped together (e.g., in time and/or frequency) to make it easier for a device to listen to messages over the different resources (e.g., during a wake period for the device).

The aggregation procedures disclosed herein can be further refined in one or more of the manners that follow.

A data message may include an indication of the identity of the data source (e.g., a sensor ID). This allows the WAN to authenticate the originator of the data message.

A data message may include an indication of a destination (e.g., a destination address such as an IP address). This allows the WAN to deliver the data.

A data message may be encrypted and include an authenticator. Such security protection may be based on credentials shared between the MTC device and the WAN. This information allows the WAN to verify the integrity and authenticity of the message, and to eventually decrypt it.

A data message may include an authenticator which is based on a shared key between the MTC device and another device (e.g., the UE). This information may be based on public key infrastructure. In this case, the MTC device may include the public key, a public key chain, or a pointer to a public key that the other device (e.g., the UE) may hold cached.

A data message may include a time stamp. Such a time stamp can indicate, for example, the delay tolerance (e.g., an expiry time) for the message. Evaluation of this time stamp may set another trigger condition for the UE to deliver the cached messages to the WAN.

A relay device may cache a data message together with an identifier of the cell (e.g., a Cell Global Identifier (CGI)) that the relay device has selected (e.g., during idle mode) during the reception of a data message from an MTC device. This allows the relay device to inform the WAN as to the location where the relay device received the data message.

A relay device may assign a "message batch ID" to the set of cached messages, whereby the relay device returns this ID to each applicable MTC device in conjunction with (e.g., in response to) message delivery. This message batch ID can be used by the WAN for a collective delivery confirmation for all MTC devices later on. After message delivery, the relay device may create a new message batch ID for new MTC device messages that arrive.

The network's (e.g., the eNB's) confirmation broadcast may be executed after the destination of the MTC device's data message (e.g., an application server) has confirmed the arrival of the message. If applicable, the broadcast may include a "message batch ID" as a collective confirmation for all MTC devices that have delivered data to this particular relay device. The WAN may transmit the broadcast primarily in the cells (e.g., at the eNBs) where the relay device collected the data messages. This may reduce broadcast overhead for stationary MTC devices.

Figure 4:
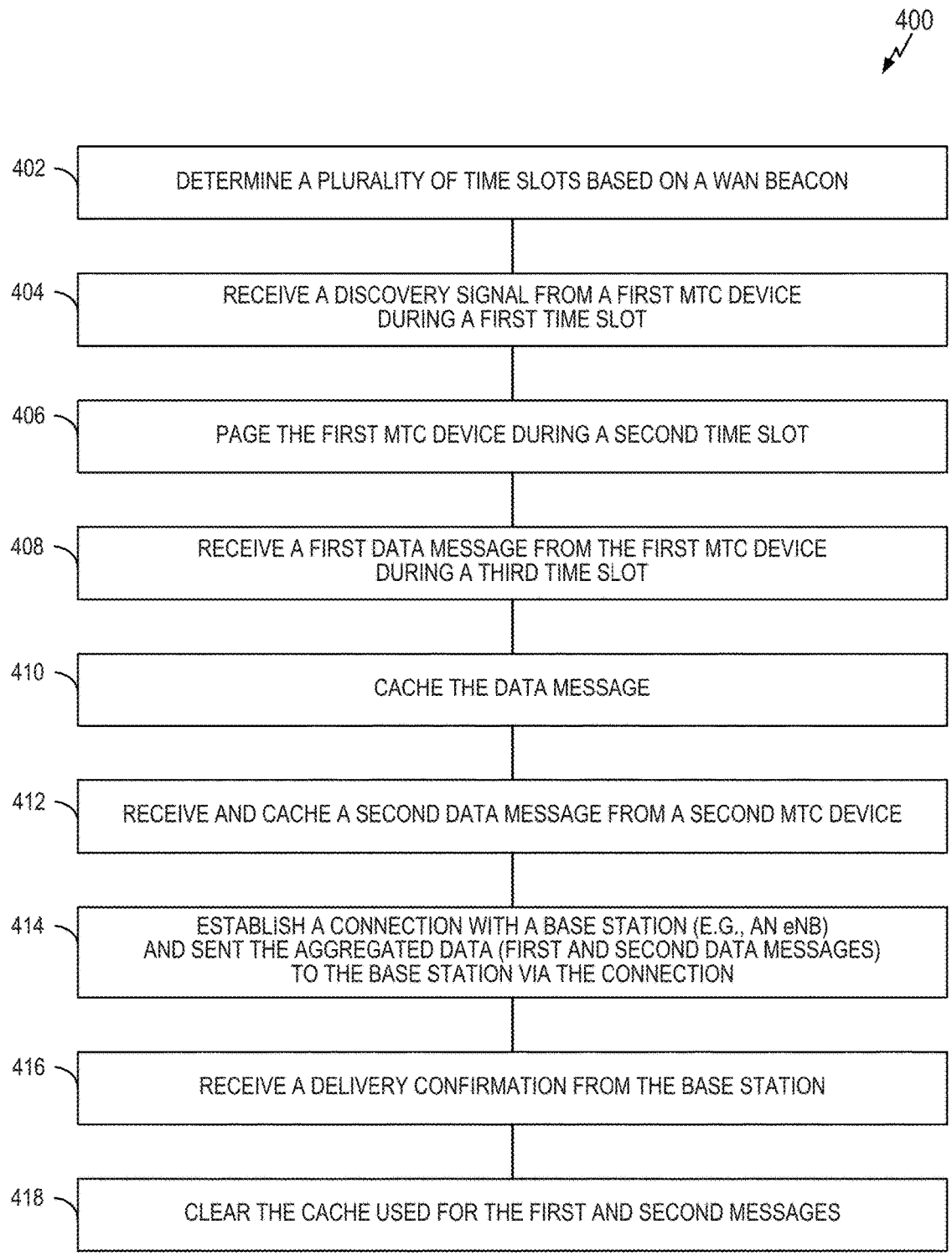
FIG. 4 illustrates an example of a relay device process relating to data aggregation and delivery in accordance with some aspects of the disclosure.

In some implementations, the timing for the D2D communication may be based off of a WAN beacon (e.g., transmitted by a nearby base station). FIG. 4 illustrates an example of a process 400 for a UE employing such timing to communicate with relays in accordance with some aspects of the disclosure. It should be appreciated that the process 400 may be implemented by any suitable apparatuses capable of supporting relay-related operations.

At block 402, the UE determines a plurality of time slots based on a WAN beacon. For example, the UE may identify the timeslots to be used for D2D discovery, paging, traffic, and acknowledgements.

At block 404, the UE receive a discovery signal from a first MTC device during a first time slot.

At block 406, the UE pages the first MTC device during a second time slot.

At block 408, the UE receives a first data message from the first MTC device during a third time slot.

At block 410, the UE caches the data message.

At block 412, the UE receives and caches a second data message from a second MTC device using a procedure similar to the procedure set forth in blocks 404-410.

At block 414, the UE establishes a connection with a base station (e.g., an eNB) and sends the aggregated data (the first and the second data messages) to the base station via the connection.

At block 416, the UE receives a delivery confirmation from the base station.

At block 418, the UE clears the cache used for the first and the second data messages.

Several example details of data aggregation and delivery will now be described with reference to FIGS. 5-10. For purposes of illustration, these figures may illustrate various components in the context of machine-to-machine (MRM) communication, machine type communication (MTC), or LTE technology. For example, the following discussion relates in some aspects to uplink communication of a machine type communication (MTC) device by aggregating and relaying communication through a first device (e.g., a relay device such as a mobile device, a UE, etc.) to a second device (e.g., a base station such as an eNB). It should be appreciated, however, that the teachings herein may be implemented using other types of radio technologies and architectures. Also, various operations may be described as being performed by specific types of components (e.g., M2M devices, MTC devices, sensors, base stations, client devices, peer-to-peer devices, user equipment (UE), and so on). It should be understood that these operations can be performed by other types of devices. To reduce the complexity of these figures, only a few example components are shown. However, the teachings herein can be implemented using a different number of components or other types of components.

Figure 5:
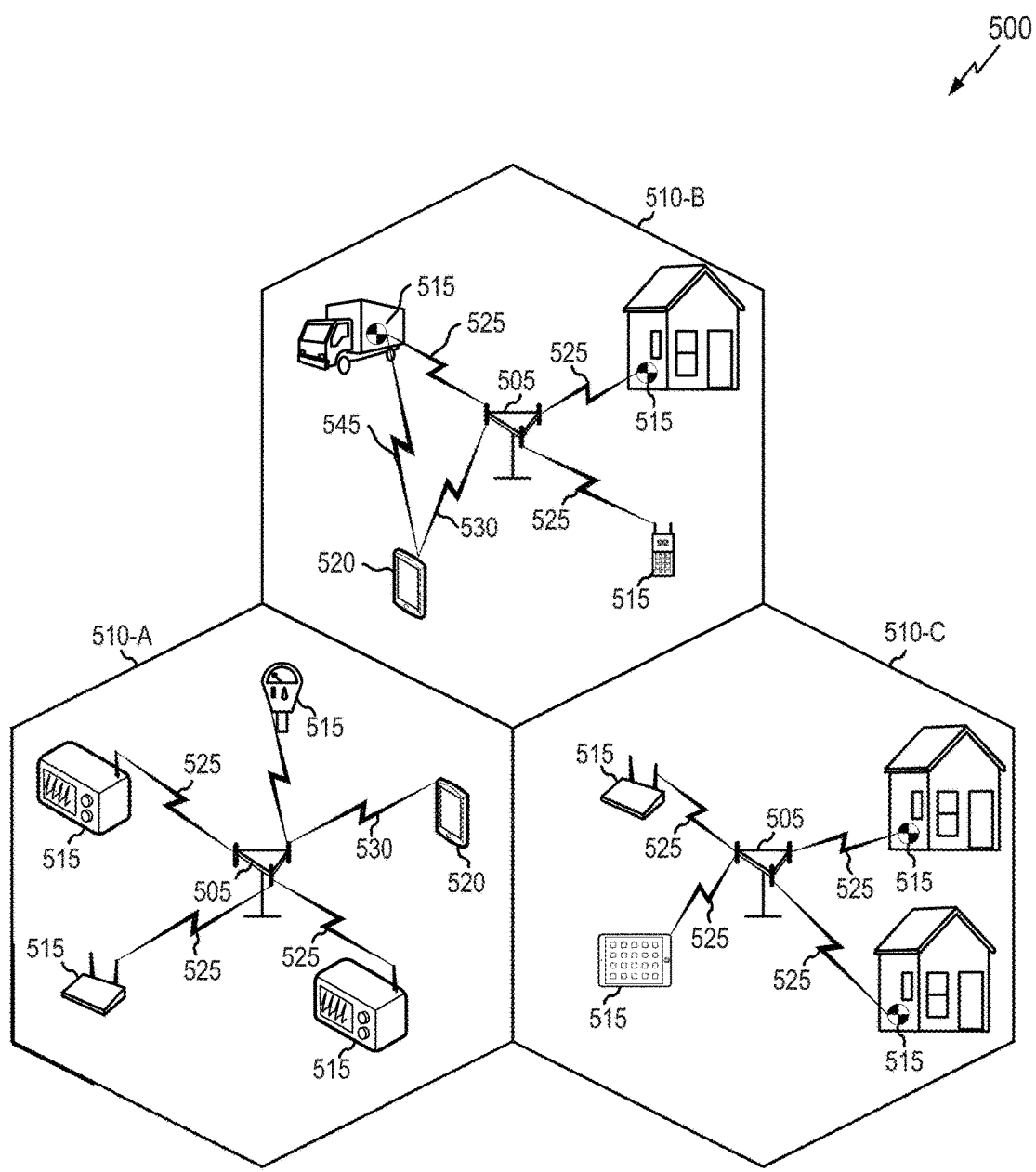
FIG. 5 illustrates an example of a wireless communication system within which aspects of the disclosure may be implemented.
Figure 5:
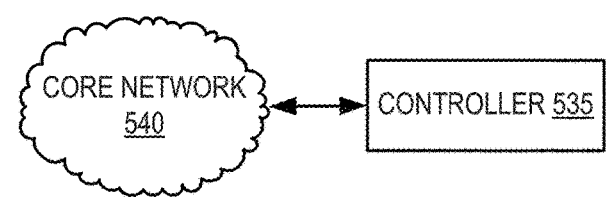

FIG. 5 illustrates an example of a wireless communication system 500 (e.g., a network). The system 500 includes base stations 505, devices (e.g., communication devices, MTC devices, etc.) 515, 520, a base station controller 535, and a core network 540 (the base station controller 535 may be integrated into the core network 540). The system 500 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described herein. Each modulated signal may be sent on a different carrier and may carry control information (e.g., pilot signals, control channels, etc.), overhead information, data, etc. The system 500 may be a multi-carrier LTE network capable of efficiently allocating network resources.

The base stations 505 may wirelessly communicate with the devices 515, 520 via a base station antenna (not shown). The base stations 505 may communicate with the devices 515, 520 under the control of the base station controller 535 via multiple carriers. Each of the base station 505 sites may provide communication coverage for a respective geographic area or cell. In some embodiments, the base stations 505 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area (or cell) for each base station 505 here is identified as 510-A, 510-B, or 510-C. The coverage area for a base station may be divided into sectors (not shown, but making up only a portion of the coverage area). The system 500 may include base stations 505 of different types (e.g., macro, pico, and/or femto base stations). A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius). There may be overlapping coverage areas for different technologies.

The devices 515, 520 may be dispersed throughout the coverage areas 510. Each device 515, 520 may be stationary or mobile. In one configuration, the devices 515, 520 may be able to communicate with different types of base stations such as, but not limited to, macro base stations, pico base stations, and femto base stations, via links 525, 530, and 545.

Some of the devices 515 may be machine type communication (MTC) devices 515 that perform various functions, capture information, and/or communicate information with limited or no human intervention. For example, MTC devices 515 may include sensors and/or meters for monitoring and/or tracking other devices, environmental conditions, etc. MTC devices 515 may be standalone devices or, in some embodiments, MTC devices 515 may be modules incorporated in other devices. Some of the other devices may be the devices 520, such as relay devices 520, which may in some cases be mobile devices or user equipments (UEs). For example, relay devices 520 such as smart phones, cellular phones and wireless communication devices, personal digital assistants (PDAs), tablets, other handheld devices, netbooks, ultrabooks, smartbooks, notebook computers, surveillance cameras, handled medical scanning devices, home appliances, etc., may include one or more MTC device modules. In other cases, relay devices 520 might not implement any MTC functionality.

In the ensuing description, various techniques are described as applied to communication and processing for the system 500 including a network and one or more MTC devices 515. It should be understood that the described techniques may be advantageously applied to other devices such as those incorporating MTC devices 515 and/or other wireless communication devices.

In some implementations, an MTC device 515 may communicate with a base station 505 by relaying information through a relay device 520. In some cases, the MTC device 515 may relay uplink data to a base station 505 through the link 545 to a relay device 520, and the relay device 520 may cache and then forward the MTC data to the base station 505 via the link 530. The base station 505 may communicate on the downlink directly with the MTC device 515 via the link 525.

In various embodiments, the relay device 520 may communicate with the MTC device 515 directly or indirectly. For example, the relay device 520 may communicate with the MTC device 515 directly via the link 545 (e.g., uplink and downlink). In addition, the relay device 520 may communicate, e.g., transmit messages, to the MTC device 515 by routing messages through a base station 505, such as via the links 530 and 525 (e.g., downlink).

The information collected by the MTC devices 515 may be transmitted across a network that includes components of the system 500 to a back-end system, such as a server. The transmission of data to/from the MTC devices 515 may be routed through the base stations 505. The base stations 505 may communicate with the MTC devices 515 on a forward link or a downlink for transmitting signaling and/or information to the MTC devices 515 and a reverse or uplink for receiving signaling and/or information from the MTC devices 515.

In one example, the base station controller 535 may be coupled to a set of base stations 505 and provide coordination and control for these base stations 505. The base station controller 535 may communicate with the base stations 505 via a backhaul (e.g., via the core network 540). The base stations 505 may also communicate with one another directly or indirectly and/or via a wireless or wireline backhaul.

The different aspects of the system 500, such as the MTC devices 515, the relay devices 520, the base stations 505, the core network 540, and/or the base station controller 535 may be configured for improving uplink communication of an MTC device 515. In one configuration, a relay device 520 may cache and relay communication received from the MTC devices 515 to a second device, such as a base station 505. The communication may be transmitted from the MTC devices 515 to the relay device 520 via the links 545 (e.g., a narrower frequency bandwidth link). The relay device 520 may relay the communication to the base station 505 via a link 530 (e.g., a broader frequency bandwidth link).

From the perspective of a relay device 520, the relay device 520 may participate in a discovery process to discover an MTC device 515. This may occur, for example, if the relay device 520 detects an MTC device 515 that has data to transmit, and/or if a base station 505 has data to communicate with the MTC device 515.

In some cases, the relay device 520 may initiate the discovery process by broadcasting a peer discovery signal to indicate availability to serve as a relay. The relay device 520 may then receive a request to serve as a relay from an MTC device 515. The relay device 520 may transmit a message to the MTC device 515 confirming that it will serve as a relay.

In other cases, the MTC device 515 may initiate the discovery process such that the relay device 520 may receive a peer discovery signal from the MTC device 515. The relay device 520 may then transmit a message indicating availability to serve as a relay to the MTC device 515. The relay device 520 may subsequently receive a request from the MTC device 515 to serve as a relay.

Once the relay relationship has been confirmed between the relay device 520 and the MTC device 515, the relay device 520 may then receive data from the discovered MTC device, such as through a peer-to-peer (P2P) link 545. The relay device 520 may thus cache the received data along with other cached received data, and relay the aggregated data to a base station through a second communication link 530, which may be a Long Term Evolution (LTE) link.

From the perspective of an MTC device 515, the MTC device 515 may participate in a discovery process with a first device 520, such as a mobile station or UE. This may occur, for example, if the MTC device 515 has data to communicate with a base station 505.

In some cases, the MTC device 515 may initiate the discovery process by broadcasting a peer discovery signal to request that a device serve as a relay for MTC communication. The MTC device 515 may receive a message from a device 520 that received the peer discovery signal. The message may indicate that the device 520 is available to serve as a relay device.

In other cases, the device 520 may initiate the discovery process. In this case, the MTC device 515 may receive a peer discovery signal from the device 520, with the peer discovery signal indicating that the device 520 is available to serve as a relay device. In response, the MTC device 515 may transmit a message confirming that the MTC device 515 has data to relay to a base station 505, for instance, through the relay device 520.

After the MTC device 515 and the relay device 520 have discovered each other, the MTC device 515 may transmit data to the relay device 520 for caching and subsequent relaying to a base station 505 with other aggregated data. In some cases, the MTC device 515 may establish a peer-to-peer (P2P) connection link 545 with the relay device 520 and transmit data to be relayed to the relay device 520 over the P2P connection link 545.

In some embodiments, uplink communication from the MTC device 515 to the base station 505 may be relayed through the relay device 520 via the links 545 and 530, while downlink communication may be communicated directly from the base station 505 to the MTC device 515 via the link 525. In this way, uplink communication budgets of the MTC devices 515 can be improved without modification to the MTC devices 515 themselves and with reduced impact to the system 500.

The relay device 520 may communicate routing information or other information to a base station 505 to enable downlink communication between the base station 505 and the MTC device 515. In various embodiments, downlink communication may be communicated directly from the base station 505 to the MTC device 515, or indirectly from the base station 505 to the MTC device 515 via the relay device 520.

Figure 6:
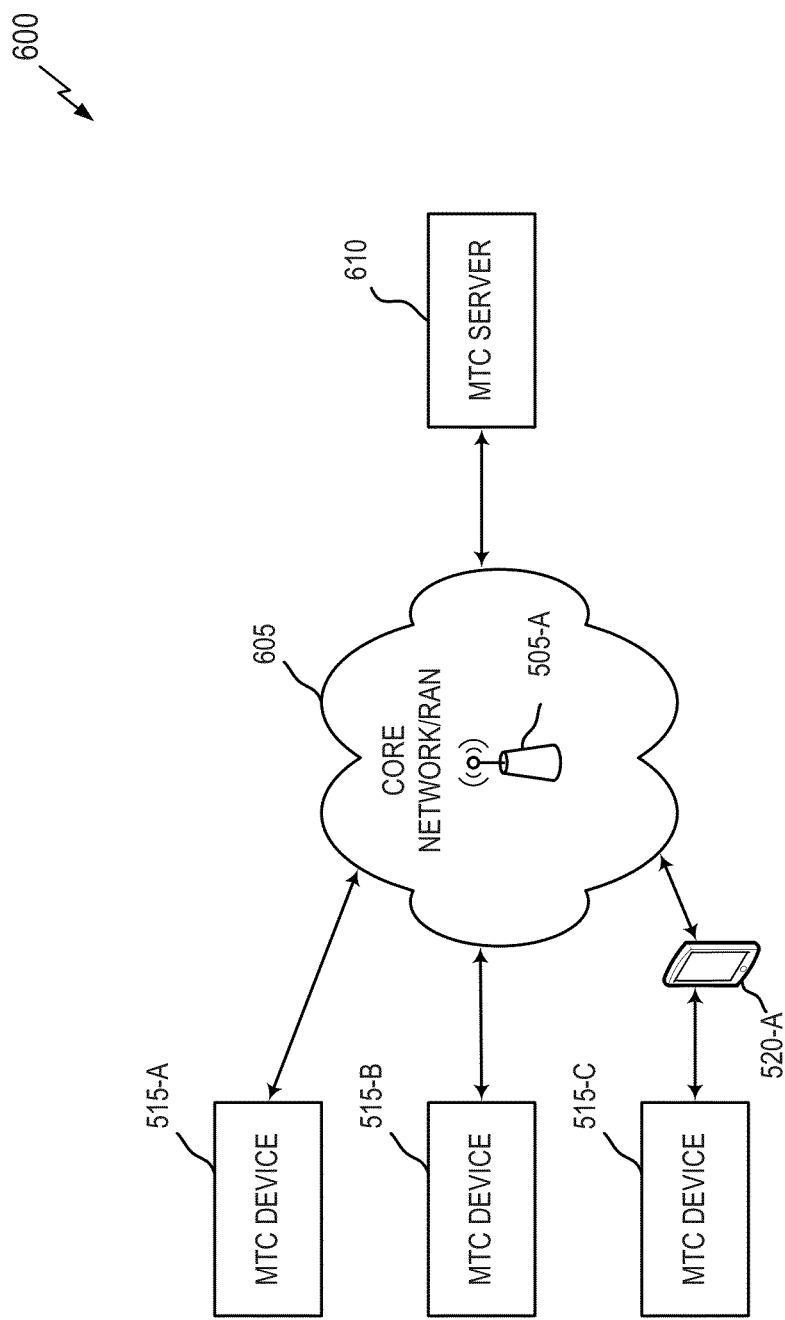
FIG. 6 illustrates an example of a wireless communication system implementing MTC service in accordance with some aspects of the disclosure.

FIG. 6 illustrates an example of a wireless communication system 600 including a Radio Access Network (RAN) or Core Network 605 implementing a machine type communication service according to one aspect. The system 600 may include any number of MTC devices 515, however for ease of explanation only three MTC devices 515-A, 515-B, and 515-C are shown in communication with an MTC server 610. Communication between the server 610 and the MTC devices 515-A, 515-B, and 515-C may be routed through a base station 505-A that may be considered part of the Core Network/RAN 605. The base station 505-A may be an example of the base stations 505 illustrated in FIG. 5. The MTC devices 515-A, 515-B, and 515-C may be examples of the MTC devices 515 illustrated in FIG. 5, or may be examples of modules of the relay devices 520 illustrated in FIG. 5. One skilled in the art would understand that the quantity of the MTC devices 515, the Core Networks/RANs 605, and the MTC servers 610 shown in FIG. 6 is for illustration purposes only and should not be construed as limiting.

The wireless communication system 600 may be operable to facilitate machine type communication between one or more MTC devices 515 and/or one or more base stations 505-A. Machine type communication may include communication between one or more devices without human intervention. In one example, machine type communication may include the automated exchange of data between a remote machine, such as an MTC device 515-A, 515-B, 515-C, and a back-end IT infrastructure, such as the MTC server 610, without user intervention. The transfer of data from an MTC device 515-A, 515-B, 515-C to the MTC server 610 via the Core Network/RAN 605 (e.g., the base station 505-A) may be performed using reverse or uplink link communication. Data collected by the MTC devices 515-A, 515-B, 515-C (e.g., monitoring data, sensor data, meter data, etc.) may be aggregated and then transferred to the MTC server 610 on the uplink communication.

The transfer of data from the MTC server 610 to an MTC device 515-A via the base station 505-A may be performed via forward or downlink link communication. The forward link may be used to send instructions, software/firmware updates, and/or messages to the MTC devices 515-A, 515-B, 515-C. The instructions may instruct the MTC devices 515-A, 515-B, 515-C to remotely monitor equipment, environmental conditions, etc. Machine type communication may be used with various applications such as, but not limited to, remote monitoring, measurement and condition recording, fleet management and asset tracking, infield data collection, distribution, physical access control, and/or storage, etc. The base station 505-A may generate one or more forward link frames with a small number of channels to transmit instructions, software/firmware updates, and/or messages. The various MTC devices 515-A, 515-B, 515-C may wake up to monitor a specific frame when instructions or other data is included on a channel of that frame.

In one embodiment, the behavior of the MTC devices 515-A, 515-B, 515-C may be pre-defined. For example, the day, time, etc., to monitor another device and transmit the collected information may be pre-defined for an MTC device 515-A, 515-B, 515-C. For example, the MTC device 515-A may be programmed to begin monitoring another device and collect information about that other device at a first pre-defined time period. The MTC device 515-A may also be programmed to transmit the collected information at a second predefined time period. The behavior of an MTC device 515-A may be remotely programmed to the MTC device 515-A.

In some embodiments, one or more MTC devices 515-A, 515-B, 515-C may have data to send to the MTC server 610, for example through the core network/RAN 605 via base station 505-A. In other cases, the MTC server 610 may request data from the one or more MTC devices 515-A, 515-B, 515-C. In either case, an MTC device 515-A, 515-B, 515-C may have uplink data to communicate to a base station 505-A to be relayed to the MTC server 610. Given that MTC devices 515-A, 515-B, 515-C may be narrow frequency bandwidth devices and/or may have limited power resources, they might not be able to effectively and timely communicate data on the uplink to a base station 505-A and/or the MTC server 610. Communication, and particularly uplink communication of an MTC device, for example the MTC device 515-C, may be improved by relaying data communication to a base station 505 and/or the MTC server 610 through a relay device 520-A. These relay techniques will be described in further detail below in reference to FIGS. 7-10.

Figure 7:
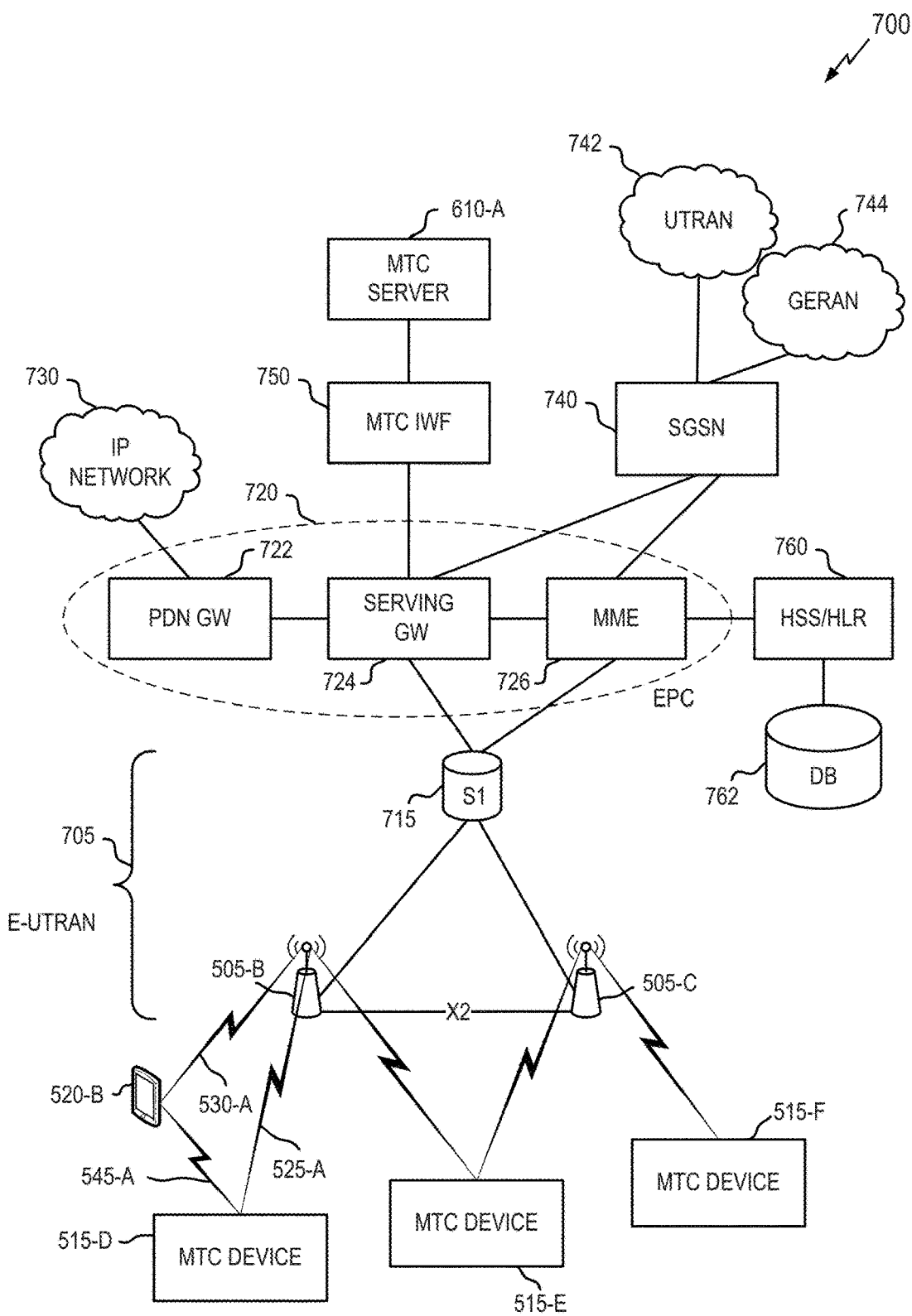
FIG. 7 illustrates another example of a wireless communication system implementing MTC service in accordance with some aspects of the disclosure.

FIG. 7 illustrates an example of a wireless communication system 700 implementing a machine type communication service over an LTE/LTE-Advanced network in accordance with various embodiments. The LTE/LTE-A network may include Evolved Universal Terrestrial Radio Access Network (E-UTRAN) 705 and Evolved Packet Core (EPC) 720. The LTE E-UTRAN 705 and EPC 720 may be configured for supporting end-to-end packet-switched communication. The EPC 720 may include a Packet Data Network (PDN) Gateway 722. The PDN Gateway 722 may be connected to one or more Internet Protocol (IP) Networks 730. IP Networks 730 may include Operator IP Networks as well as external IP Networks. For example, IP Networks 730 may include the Internet, one or more Intranets, an IP Multimedia Subsystem (IMS), and a Packet Switched (PS) Streaming Service (PSS). The PDN Gateway 722 may provide UE IP address allocation as well as other functions. The EPC 720 may interconnect with other access networks using other Radio Access Technologies (RATs). For example, the EPC 720 may interconnect with the UTRAN 742 and/or the GERAN 744 via one or more Serving GPRS Support Nodes (SGSNs) 740.

The EPC 720 may include one or more Serving Gateways 724 and/or Mobility Management Entities (MME) 726. The Serving Gateway 724 may handle the interface to the E-UTRAN 705 and provide a communication point for inter-RAT mobility (e.g., handover to the UTRAN 742 and/or the GERAN 744, etc.). Generally, the MME 726 may provide bearer and connection management while the Serving Gateway 724 may transfer user IP packets between base stations 505 and other network end-points (e.g., the PDN GW 722, etc.). For example, the MME 726 may manage intra-RAT mobility functions (e.g., Serving Gateway selection) and/or UE tracking management. The Serving Gateway 724 and the MME 726 may be implemented in one physical node of the EPC 720 or in separate physical nodes. A Home Subscriber Service (HSS) and/or home location register (HLR) node 760 may provide service authorization and/or user authentication for UEs. The HSS/HLR node 760 may communicate with one or more databases 762.

The E-UTRAN 705 may include one or more base stations or eNBs 505-B, 505-C which provide user and control plane protocol terminations for the MTC devices 515-D, 515-E, 515-F, and/or a relay device or a UE device 520-B over the air interface of the LTE network. The eNBs 505-B, 505-C may be connected with an X2 interface for intra-eNB communication. The base station 505-B, 505-C may be connected to the Serving Gateway 724 and/or the MME 726 over an S-1 interface 715 for communicating data traffic and/or control plane information. The MTC devices 515-D, 515-E, 515-F, and/or the relay device 520-B may be configured to collaboratively communicate with multiple base stations 505 through, for example, Multiple Input Multiple Output (MIMO), Coordinated Multi-Point (CoMP), or other schemes as described in more detail below.

In some embodiments, the wireless communication system 700 includes an MTC inter-working function (IWF) module 750, which may provide an interface between the EPC 720 and one or more external MTC Servers 610-A for providing MTC service within the LTE network. The MTC server 610-A may be an example of the MTC server 610 of FIG. 6. The MTC server 610-A may be operated by the proprietor of the MTC devices 515 and may perform functions associated with deployment of the MTC devices 515 such as receiving and processing MTC device data. The MTC server 610-A may be connected directly to the EPC 720 or may be connected through the MTC IWF module 750 and/or other networks such as the Internet. The MTC IWF module 750 may be implemented in one or more existing physical nodes of the EPC 720 (e.g., the Serving Gateway 724, etc.), or in a separate physical node connected to the EPC 720.

The wireless communication system 700 may further support relay of communication from an MTC device 515-D to a base station 505-B through a relay device 520-B. For example, the relay device 520-B may participate in a discovery process with an MTC device 515-D. After the relay device 520-B and the MTC device 515-D have discovered each other, the relay device 520-B may receive data from the discovered MTC device 515-D over the link 545-A, which may be a P2P link, implementing LTE-D, Wi-Fi-Direct, or other P2P technology, for example. The relay device 520-B may then aggregate this data along with data received from other MTC devices and then forward (relay) the aggregated MTC data to the base station 505-B over the link 530-A, which may implement LTE, or other WLAN technology. In other embodiments, the MTC device 515-D may participate in a discovery process with the relay device 520-B. Once discovery is complete, the MTC device 515-D may transmit data to the relay device 520-B via the link 545-A to be aggregated and then relayed to the base station 505-B via the link 530-A. In some embodiments, the relay device 520-B may communicate, e.g., transmit messages to the MTC device 515-D, through the base station 505-B, such as through the links 530-A and 525-A.

Figure 8:
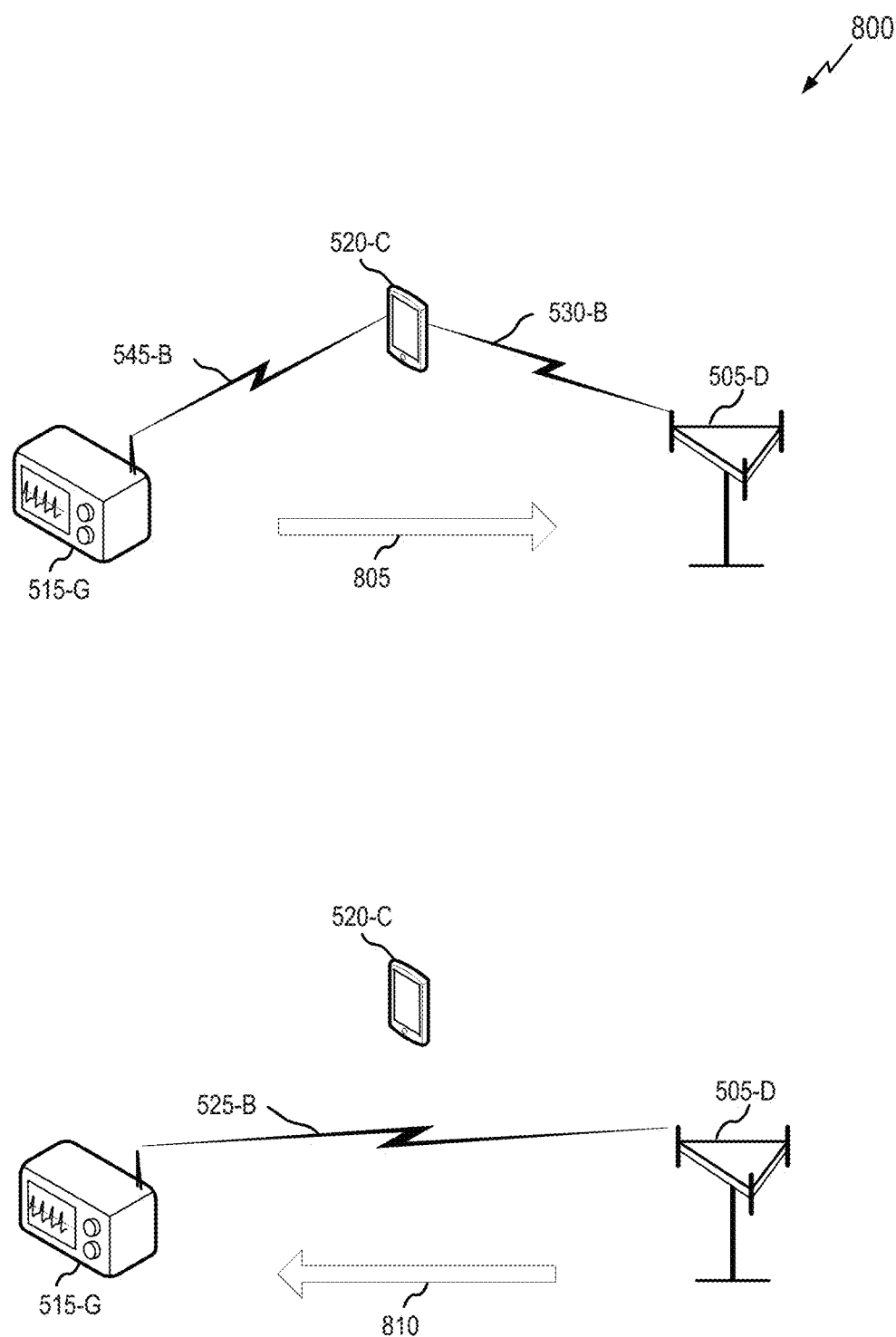
FIG. 8 illustrates examples of wireless communication for a machine type communication (MTC) device in accordance with some aspects of the disclosure.

FIG. 8 illustrates an example of wireless communication 800 between an MTC device 515-G, a relay device 520-C, and a base station 505-D in accordance with various embodiments. The MTC device 515-G may be an example of the MTC device 515 of FIGS. 5, 6, and/or 7. The relay device 520-C may be an example of the relay device or a UE device 520 of FIGS. 5, 6, and/or 7. The base station 505-D, which may be a cellular base station, an eNB, a WLAN access point, etc., may be an example of the base station 505 of FIGS. 5, 6, and/or 7. The MTC device 515-G may communicate with the base station 505-D on the uplink 805 and on the downlink 810.

In some embodiments, the MTC device 515-G may communicate on the uplink 805 with the base station 505-D through relaying communication through a relay device 520-C. The MTC device 515-G and the relay device 520-C may participate in a discovery process. Once discovery is complete, the relay device 520-C may receive data from the discovered MTC device 515-G via the link 545-B, which may be a LTE-D link, to be aggregated and relayed to the base station 505-D. After receiving the MTC data from the MTC device 515-G and aggregating this data with other received data, the relay device 520-C may then forward the aggregated MTC data to the base station 505-D via the link 530-B, which may be an LTE link.

From the perspective of the MTC device 515-G, the process for relaying data through the relay device 520-C to the base station 505-D may be described as follows. The MTC device 515-G and the relay device 520-C may participate in a discovery process. Once discovery is complete, the MTC device may transmit data to be relayed to the base station 505-D which in turn may be relayed to an MTC server, such as the MTC server 610 as described above in reference to FIGS. 6 and/or 7. The MTC device 515-G may transmit the data first to the relay device 520-C via the link 545-B, which may be a P2P link, such as an LTE-D link or other type of WLAN link, such as a WiFi-Direct link, to be relayed to the base station 505-D. The relay device 520-C may then aggregate and forward the MTC data to the base station 505-D via the link 530-B, which may be an LTE or other WLAN link.

In some embodiments, the base station 505-D may communicate on the downlink 810 directly with the MTC device 515-G, such as over the link 525-B. In some cases, the link 525-B may be an LTE link, as described above, or may implement another radio access technology, such as WLAN, 3G, 4G, 5G, etc. In some cases, by allowing direct communication on the downlink 810 between the MTC device 515-G and the base station 505-D, the impact on the network, such as the system 500, may be reduced. Impact on the network may be reduced by, for example, utilizing less resources of a relay device 520-C.

It should be appreciated that in some cases, it may be beneficial for the MTC device 515-G, the relay device 520-C, and/or the base station 505-D for downlink communication between the base station 505-D and the MTC device 515-G to also be relayed through the relay device 520-C.

Figure 9:
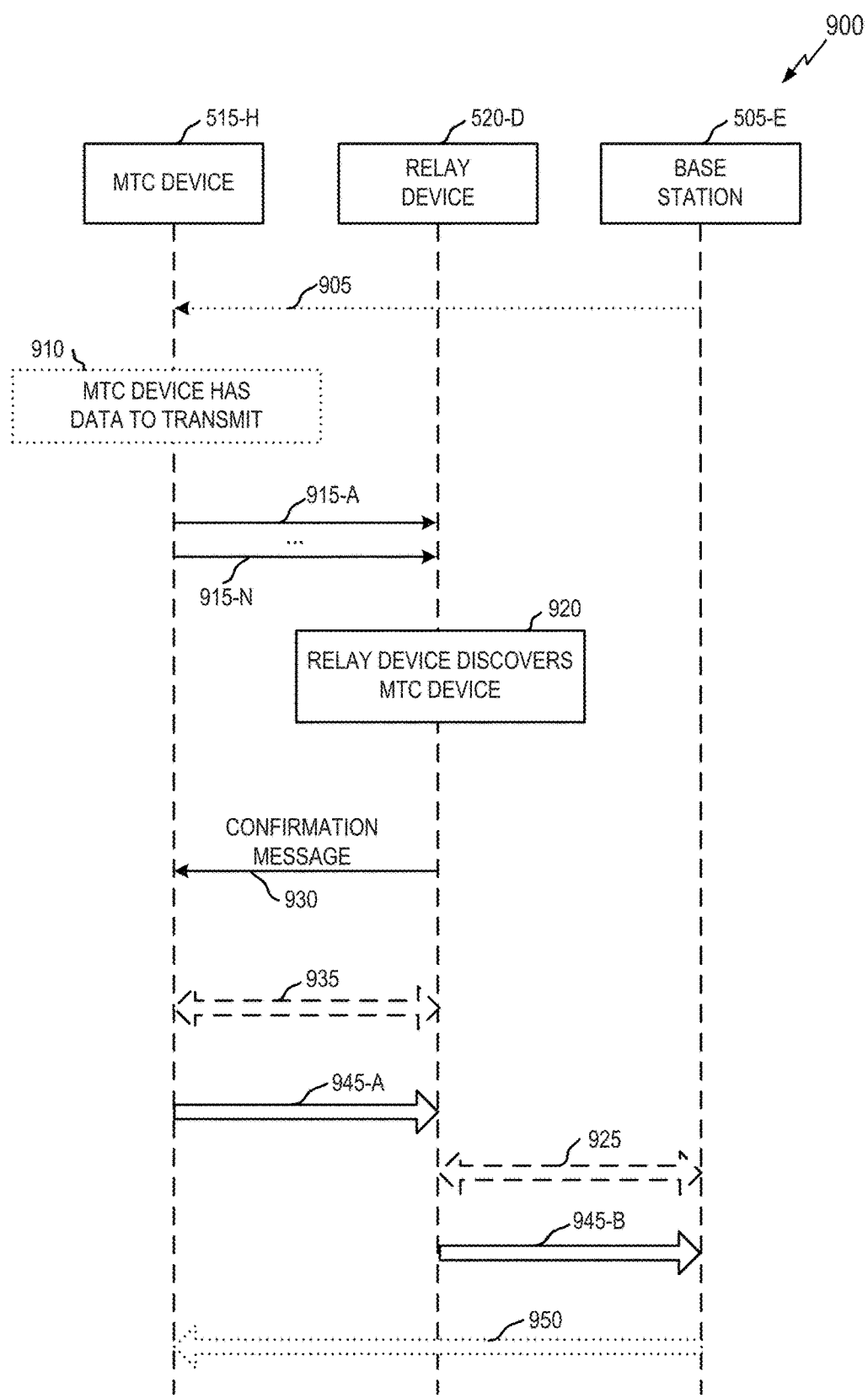
FIG. 9 illustrates an example of a flow diagram for relaying communication of an MTC device through a relay device to a base station in accordance with some aspects of the disclosure.

Turning next to FIG. 9, a flow diagram 900 illustrates an example of an MTC device 515-H relaying communication to a base station 505-E through a relay device 520-D in accordance with various embodiments. The MTC device 515-H may be an example of the MTC device 515 of FIGS. 5, 6, 7, and/or 8. The relay device 520-D may be an example of the relay device or the UE device 520 of FIGS. 5, 6, 7, and/or 8. The base station 505-E, which may be a cellular base station, an eNB, or a WLAN access point, may be an example of the base station 505 of FIGS. 5, 6, 7, and/or 8.

In some embodiments, an MTC server 610 may, through the base station 505-E, transmit one or more messages 905 to the MTC device 515-H, for example, to request that the MTC device 515-H send data to the MTC server 610 through the base station 505-E. The data, for instance, may include sensor or related data. In other cases, the MTC server 610 through the base station 505-E, may notify the MTC device 515-H that it has software updates, revised scheduling of MTC reporting, or other operation information to convey to the MTC device 515-H. The base station 505-E may transmit one or more messages 905 to the MTC device 515-H indicating a need, by the base station 505-E and/or the MTC server 610, to communicate with the MTC device 515-H. The MTC device 515-H may then transmit or broadcast one or more discovery signals 915-A to 915-*n*, such as one or more peer discovery signals, to establish a relay link with a relay device 520-D.

In other cases, the MTC device 515-H may have data to transmit 910 to an MTC server 610, such as through a base station 505-E. In some cases, the MTC device 515-H may have data to transmit 910 and may be messaged by the base station 505-E concurrently.

In any of the above cases, the MTC device 515-H may broadcast a discovery signal 915-A to 915-n until discovered by a relay device 520-D. The relay device 520-D may then discover 920 the MTC device 515-H. In some cases, if the MTC device 515-H is not discovered within a certain time period, for example 100 seconds, the MTC device 515-H may stop broadcasting a discovery signal 915, and may broadcast a discovery signal 915 at another time. After the relay device 520-D discovers 920 the MTC device 515-H, the relay device 520-D may then confirm that it will act as a relay for the MTC device 515-H by routing a confirmation message 930 to the MTC device 515-H. The relay device 520-D may communicate a confirmation message directly with the MTC device 515-H, for example through the link 545 as described above in reference to FIGS. 5, 7, and/or 8.

In some cases, the relay device 520-D may be pre-set to serve as a relay, or a user of the relay device 520-D may confirm availability to serve as a relay, such as via an interface of the relay device 520-D.

The MTC device 515-H and the relay device 520-C may then establish a link 935 between them. In some cases, the link 935 may be referred to as an access link. After the relay relationship has been confirmed and established, such as through the access link 935, the MTC device 515-H may then send uplink communication 945-A to the relay device 520-D. The relay device 520-D caches the data, aggregates the data with other received data, establishes a relay link 925 with the base station 505-E, and then forwards the MTC data 945-B to the base station 505-E via the relay link 925. In some embodiments, the access link 935 and the relay link 925 may be examples of the links 545 and 530 as described above in reference to FIGS. 5, 7, and/or 8.

In some embodiments, such as where the base station 505-E, with instructions from an MTC server 610, messages 905 the MTC device 515-H, the base station 505-E may then transmit information 950 (e.g., updates, or other operation information) directly to the MTC device 515-H. In some cases, the base station 505-E may transmit information 950 including other messages or data directly to the MTC device 515-H.

Figure 10:
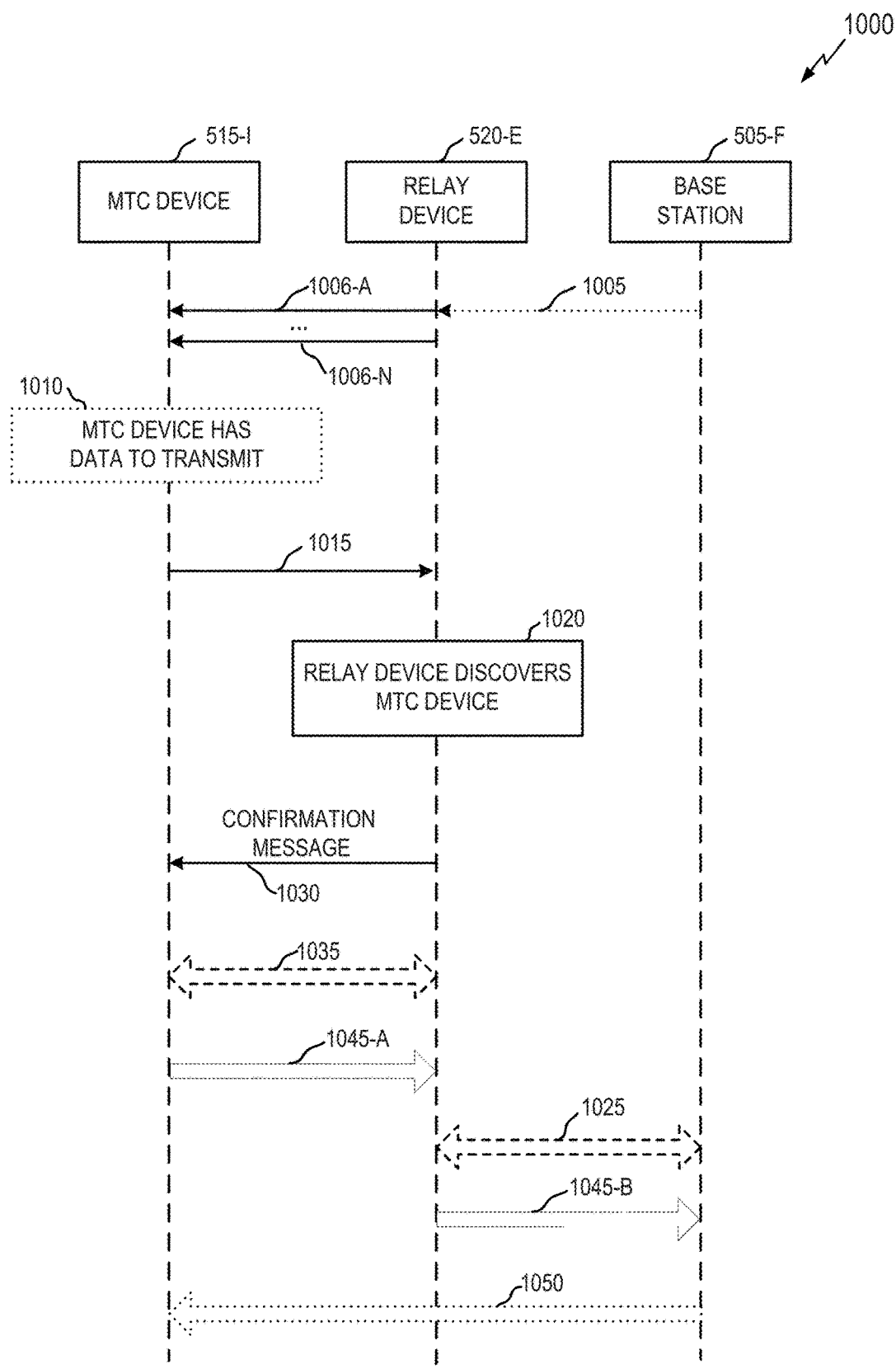
FIG. 10 illustrates another example of a flow diagram for relaying communication of a machine type communication (MTC) device through a relay device to a base station in accordance with some aspects of the disclosure.

Turning next to FIG. 10, a flow diagram 1000 illustrates an example of an MTC device 515-I relaying communication to a base station 505-F through a relay device 520-E in accordance with various embodiments. The MTC device 515-I may be an example of the MTC device 515 of FIGS. 5, 6, 7, 8, and/or 9. The relay device 520-E may be an example of the relay device or the UE device 520 of FIGS. 5, 6, 7, 8, and/or 9. The base station 505-F, which may be a cellular base station, eNB, or WLAN access point, may be an example of the base station 505 of FIGS. 5, 6, 7, 8, and/or 9.

In some embodiments, a relay device 520-E that is configured to act as a relay for MTC communication, may broadcast one or more discovery signals 1006-A to 1006-n, such as one or more peer discovery signals, to the MTC device 515-I. This may be done by the relay device 520-E periodically or when, for instance, the relay device 520-E detects that an MTC device 515-I is nearby. In other cases, an MTC server 610 may, through the base station 505-F transmit one or more messages 1005 to the relay device 520-E to then forward to the MTC device 515-I. After receiving the message 1005 from the base station 505-F, the relay device 520-E may transmit one or more discovery signals 1006-A to 1006-n to the MTC device 515-I to establish a connection to communicate the information from the base station 505-F to the MTC device 515-I.

In some embodiments, the MTC device 515-I may have data to transmit 1010 prior to, concurrently, or shortly after receipt of the discovery signal(s) 1006 sent from the relay device 520-E. In other cases, the MTC device 515-I might not have data to transmit when or proximate in time to when it receives the discovery signal 1006 from the relay device 520-E. In either case, the MTC device 515-I may then decide to respond 1015 to the discovery request sent by the relay device 520-E to confirm establishment of a link between the MTC device 515-I and the relay device 520-E.

The relay device 520-E may thus discover 1020 the MTC device 515-I, confirm 1030 that it will act as a relay for MTC device 515-I, and establish a link 1035 with the MTC device 515-I, as similarly described above in reference to FIG. 9. Uplink data may then be communicated 1045-A to the relay device 520-E.

At some point in time, the relay device 520-E establishes a link 1025 with the base station 505-F. At this point, the uplink data 1045-A received from the MTC device 515-I can be communicated 1045-B by the relay device 520-E to the base station 505-F, if desired. Additionally, the base station 505-F may communicate on a downlink 1050 directly with the MTC device 515-I. In some cases, the link 1025 established by the relay device 520-E with the base station 505-F may be an example of the link 530 as described above in reference to FIGS. 5, 7, and/or 8. Establishment of the link 1035 between the MTC device 515-I and the relay device 520-E may be an example of the link 545 as also described in reference to FIGS. 5, 7, and/or 8. Routing a confirmation message by the relay device 520-E through the base station 505-F to the MTC device 515-I may be accomplished via the links 530 and 525 described above in reference to FIGS. 5 and/or 7, in cases where the link 1025 has been established at this time.

Example Apparatus

Figure 11:
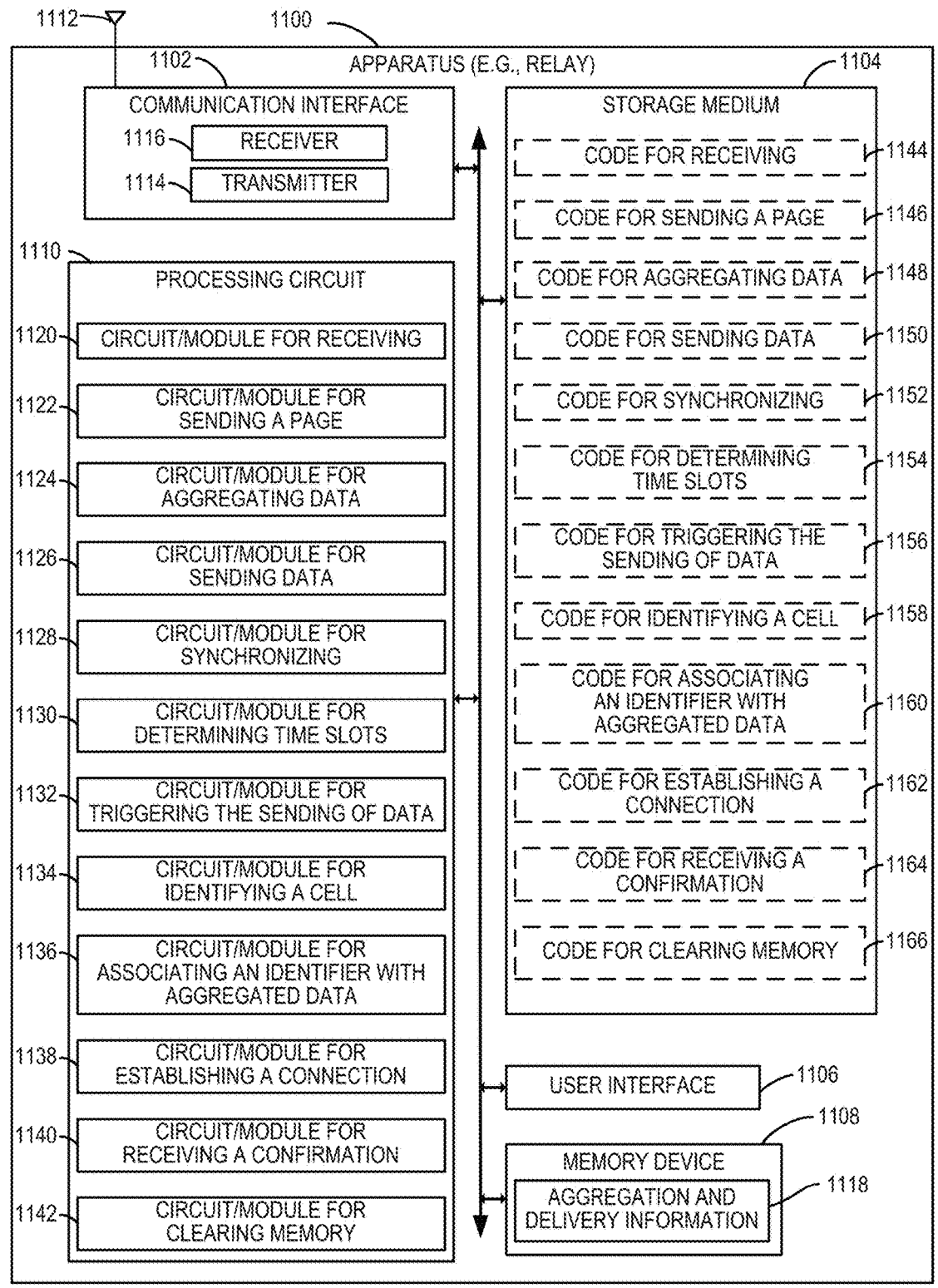
FIG. 11 illustrates a block diagram of an example hardware implementation for an apparatus (e.g., an electronic device) that executes processes for communication in accordance with some aspects of the disclosure.

FIG. 11 illustrates a block diagram of an example hardware implementation of an apparatus 1100 configured to communicate according to one or more aspects of the disclosure. For example, the apparatus 1100 could embody or be implemented within a relay device. In various implementations, the apparatus 1100 could embody or be implemented within an access terminal, an access point, or some other type of device. In various implementations, the apparatus 1100 could embody or be implemented within a mobile phone, a smart phone, a tablet, a portable computer, a server, a personal computer, a sensor, and or any other electronic device having circuitry.

The apparatus 1100 includes a communication interface (e.g., at least one transceiver) 1102, a storage medium 1104, a user interface 1106, a memory device (e.g., a memory circuit) 1108, and a processing circuit (e.g., at least one processor) 1110. In various implementations, the user interface 1106 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 11. The signaling bus may include any number of interconnecting buses and bridges depending on the specific application of the processing circuit 1110 and the overall design constraints. The signaling bus links together various circuits such that each of the communication interface 1102, the storage medium 1104, the user interface 1106, and the memory device 1108 are coupled to and/or in electrical communication with the processing circuit 1110. The signaling bus may also link various other circuits (not shown) such as timing sources, peripherals, voltage regulators, and power management circuits, which are well known in the art, and therefore, will not be described any further.

The communication interface 1102 provides a means for communicating with other apparatuses over a transmission medium. In some implementations, the communication interface 1102 includes circuitry and/or programming adapted to facilitate the communication of information bi-directionally with respect to one or more communication devices in a network. In some implementations, the communication interface 1102 is adapted to facilitate wireless communication of the apparatus 1100. In these implementations, the communication interface 1102 may be coupled to one or more antennas 1112 as shown in FIG. 11 for wireless communication within a wireless communication system. The communication interface 1102 can be configured with one or more standalone receivers and/or transmitters, as well as one or more transceivers. In the illustrated example, the communication interface 1102 includes a transmitter 1114 and a receiver 1116. The communication interface 1102 serves as one example of a means for receiving and/or means transmitting.

The memory device 1108 may represent one or more memory devices. As indicated, the memory device 1108 may maintain aggregation and delivery information 1118 along with other information used by the apparatus 1100. In some implementations, the memory device 1108 and the storage medium 1104 are implemented as a common memory component. The memory device 1108 may also be used for storing data that is manipulated by the processing circuit 1110 or some other component of the apparatus 1100.

The storage medium 1104 may represent one or more computer-readable, machine-readable, and/or processor-readable devices for storing programming, such as processor executable code or instructions (e.g., software, firmware), electronic data, databases, or other digital information. The storage medium 1104 may also be used for storing data that is manipulated by the processing circuit 1110 when executing programming. The storage medium 1104 may be any available media that can be accessed by a general purpose or special purpose processor, including portable or fixed storage devices, optical storage devices, and various other mediums capable of storing, containing or carrying programming.

By way of example and not limitation, the storage medium 1104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1104 may be embodied in an article of manufacture (e.g., a computer program product). By way of example, a computer program product may include a computer-readable medium in packaging materials. In view of the above, in some implementations, the storage medium 1104 may be a non-transitory (e.g., tangible) storage medium.

The storage medium 1104 may be coupled to the processing circuit 1110 such that the processing circuit 1110 can read information from, and write information to, the storage medium 1104. That is, the storage medium 1104 can be coupled to the processing circuit 1110 so that the storage medium 1104 is at least accessible by the processing circuit 1110, including examples where at least one storage medium is integral to the processing circuit 1110 and/or examples where at least one storage medium is separate from the processing circuit 1110 (e.g., resident in the apparatus 1100, external to the apparatus 1100, distributed across multiple entities, etc.).

Programming stored by the storage medium 1104, when executed by the processing circuit 1110, causes the processing circuit 1110 to perform one or more of the various functions and/or process operations described herein. For example, the storage medium 1104 may include operations configured for regulating operations at one or more hardware blocks of the processing circuit 1110, as well as to utilize the communication interface 1102 for wireless communication utilizing their respective communication protocols.

The processing circuit 1110 is generally adapted for processing, including the execution of such programming stored on the storage medium 1104. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1110 is arranged to obtain, process and/or send data, control data access and storage, issue commands, and control other desired operations. The processing circuit 1110 may include circuitry configured to implement desired programming provided by appropriate media in at least one example. For example, the processing circuit 1110 may be implemented as one or more processors, one or more controllers, and/or other structure configured to execute executable programming. Examples of the processing circuit 1110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1110 are for illustration and other suitable configurations within the scope of the disclosure are also contemplated.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 1-10 and 12-18. As used herein, the term "adapted" in relation to the processing circuit 1110 may refer to the processing circuit 1110 being one or more of configured, employed, implemented, and/or programmed to perform a particular process, function, operation and/or routine according to various features described herein.

The processing circuit 1110 may be a specialized processor, such as an application specific integrated circuit (ASIC) that serves as a means for (e.g., structure for) carrying out any one of the operations described in conjunction with FIGS. 1-10 and 12-18. The processing circuit 1110 serves as one example of a means for transmitting and/or a means for receiving.

According to at least one example of the apparatus 1100, the processing circuit 1110 may include one or more of a circuit/module for receiving 1120, a circuit/module for sending a page 1122, a circuit/module for aggregating data 1124, a circuit/module for sending data 1126, a circuit/module for synchronizing 1128, a circuit/module for determining time slots 1130, a circuit/module for triggering the sending of data 1132, a circuit/module for identifying a cell 1134, a circuit/module for associating an identifier with aggregated data 1136, a circuit/module for establishing a connection 1138, a circuit/module for receiving a confirmation 1140, a circuit/module for clearing memory 1142.

The circuit/module for receiving 1120 may include circuitry and/or programming (e.g., code for receiving 1144 stored on the storage medium 1104) adapted to perform several functions relating to, for example, receiving discovery signals. Initially, the circuit/module for receiving 1120 obtains received information. For example, the circuit/module for receiving 1120 may obtain this information from a component of the apparatus 1100 (e.g., the receiver 1116, the memory device 1108, or some other component) or directly from a device (e.g., an MTC device) that transmitted the information. In some implementations, the circuit/module for receiving 1120 identifies a memory location of a value in the memory device 1108 and invokes a read of that location. In some implementations, the circuit/module for receiving 1120 processes (e.g., decodes) the received information. The circuit/module for receiving 1120 then outputs the received information (e.g., stores the received information in the memory device 1108 or sends the information to another component of the apparatus 1100). In some implementations, the receiver 1116 includes the circuit/module for receiving 1120 and/or the code for receiving 1144.

The circuit/module for sending a page 1122 may include circuitry and/or programming (e.g., code for sending a page 1146 stored on the storage medium 1104) adapted to perform several functions relating to, for example, sending a page to each of a plurality of first devices as a result of receipt of discovery signals from the first devices. Initially, the circuit/module for sending a page 1122 receives the discovery signals (e.g., via the receiver 1116). The circuit/module for sending a page 1122 then identifies the devices that sent the discovery signals (e.g., based on the time slots in which the discovery signals were present). The circuit/module for sending a page 1122 then sends a page to each of these devices via the appropriate paging channel (e.g., time slots). To this end, the circuit/module for sending a page 1122 may send the pages to the transmitter 1114 or some other component for transmission. In some implementations, the communication interface 1102 includes the circuit/module for sending a page 1122 and/or the code for sending a page 1146.

The circuit/module for aggregating data 1124 may include circuitry and/or programming (e.g., code for aggregating data 1148 stored on the storage medium 1104) adapted to perform several functions relating to, for example, aggregating data received from different devices. Initially, the circuit/module for aggregating data 1124 receives the data (e.g., via the receiver 1116). The circuit/module for aggregating data 1124 then stores the data (e.g., in the memory device 1108 or some other component).

The circuit/module for sending data 1126 may include circuitry and/or programming (e.g., code for sending data 1150 stored on the storage medium 1104) adapted to perform several functions relating to, for example, sending aggregated data to a second device. Initially, the circuit/module for sending data 1126 obtains the aggregated data (e.g., from the memory device 1108). The circuit/module for sending data 1126 may then format the data for sending (e.g., in a message, according to a protocol, etc.). The circuit/module for sending data 1126 then sends the data to the second device. To this end, the circuit/module for sending data 1126 may send the data to the transmitter 1114 or some other component for transmission. In some implementations, the communication interface 1102 includes the circuit/module for sending data 1126 and/or the code for sending data 1150.

The circuit/module for synchronizing 1128 may include circuitry and/or programming (e.g., code for synchronizing 1152 stored on the storage medium 1104) adapted to perform several functions relating to, for example, synchronizing to timing designated for communicating with devices. Initially, the circuit/module for synchronizing 1128 receives an indication of the timing (e.g., from the receiver 1116). For example, the timing may be based on beacon timing, GPS timing, network timing, or some other timing signal. The circuit/module for synchronizing 1128 then synchronizes the timing of the apparatus 1100 (e.g., time slot timing) to the timing indicated by the received indication. For example, the discovery, paging, traffic, and acknowledgement (confirmation) time slots may be synchronized to this timing. The circuit/module for synchronizing 1128 also may send an indication of the timing (e.g., time slot identifiers) to a component of the apparatus 1100 (e.g., the memory device 1108 or some other component).

The circuit/module for determining time slots 1130 may include circuitry and/or programming (e.g., code for determining time slots 1154 stored on the storage medium 1104) adapted to perform several functions relating to, for example, determining time slots based on a WAN beacon. Initially, the circuit/module for determining time slots 1130 receives an indication of beacon timing (e.g., from the receiver 1116). The circuit/module for determining time slots 1130 then determines, based on the indication, the timing of one or more time slots. For example, the timing of discovery, paging, traffic, and acknowledgement (confirmation) time slots may be defined relative to the beacon timing. The circuit/module for determining time slots 1130 then sends an indication of the determination (e.g., time slot identifiers) to a component of the apparatus 1100 (e.g., the memory device 1108 or some other component).

The circuit/module for triggering the sending of data 1132 may include circuitry and/or programming (e.g., code for triggering the sending of data 1156 stored on the storage medium 1104) adapted to perform several functions relating to, for example, triggering the sending of data based on at least one criterion. Initially, the circuit/module for triggering the sending of data 1132 obtains the at least one criterion (e.g., from the memory device 1108). The circuit/module for triggering the sending of data 1132 then compares the at least one criterion with a current parameter (e.g., the amount of data accumulated, the time of day, etc.). The circuit/module for triggering the sending of data 1132 may then send an indication to a component of the apparatus 1100

(e.g., the transmitter 1114 or some other component) to commence the sending of data depending on the result of the comparison. In some implementations, the communication interface 1102 includes the circuit/module for triggering the sending of data 1132 and/or the code for triggering the sending of data 1156.

The circuit/module for identifying a cell 1134 may include circuitry and/or programming (e.g., code for identifying a cell 1158 stored on the storage medium 1104) adapted to perform several functions relating to, for example, identifying a cell within which data from at least one device was received. Initially, the circuit/module for identifying a cell 1134 determines whether data was received (e.g., based on a signal from the receiver 1116). The circuit/module for identifying a cell 1134 then determines the current cell during the receipt of the data (e.g., based on a cell identifier received by the receiver 1116 and stored in the memory device 1108). The circuit/module for identifying a cell 1134 then sends an indication of the cell to a component of the apparatus 1100 (e.g., the communication interface 1102 or some other component).

The circuit/module for associating an identifier with aggregated data 1136 may include circuitry and/or programming (e.g., code for associating an identifier with aggregated data 1160 stored on the storage medium 1104) adapted to perform several functions relating to, for example, associating an identifier with aggregated data that was received from a plurality of devices. Initially, the circuit/module for associating an identifier with aggregated data 1136 determines that data has been aggregated (e.g., via the receiver 1116). The circuit/module for associating an identifier with aggregated data 1136 then selects an identifier (e.g., a batch ID). The circuit/module for associating an identifier with aggregated data 1136 then causes the identifier to be sent to the appropriate destination (e.g., via the transmitter 1114).

The circuit/module for establishing a connection 1138 may include circuitry and/or programming (e.g., code for establishing a connection 1162 stored on the storage medium 1104) adapted to perform several functions relating to, for example, establishing a connection with a base station. In some implementations, the circuit/module for establishing a connection 1138 communicates with a base station (e.g., an LTE eNB) to establish a connection with a network (e.g., an LTE network). For example, the circuit/module for establishing a connection 1138 may access a base station on a random access channel or some other channel.

The circuit/module for receiving a confirmation 1140 may include circuitry and/or programming (e.g., code for receiving a confirmation 1164 stored on the storage medium 1104) adapted to perform several functions relating to, for example, receiving a delivery confirmation in response to aggregated data being sent. Initially, the circuit/module for receiving a confirmation 1140 obtains received information. For example, the circuit/module for receiving a confirmation 1140 may obtain this information from a component of the apparatus 1100 (e.g., the receiver 1116, the memory device 1108, or some other component) or directly from a device (e.g., a base station) that transmitted the information. In some implementations, the circuit/module for receiving a confirmation 1140 identifies a memory location of a value in the memory device 1108 and invokes a read of that location. In some implementations, the circuit/module for receiving a confirmation 1140 processes (e.g., decodes) the received information. The circuit/module for receiving a confirmation 1140 then outputs an indication of whether the confirmation has been received (e.g., stores the received information in the memory device 1108 or sends the information to another component of the apparatus 1100). In some implementations, the receiver 1116 includes the circuit/module for receiving a confirmation 1140 and/or the code for receiving a confirmation 1164.

The circuit/module for clearing memory 1142 may include circuitry and/or programming (e.g., code for clearing memory 1166 stored on the storage medium 1104) adapted to perform several functions relating to, for example, clearing memory used for storing received data. Initially, the circuit/module for clearing memory 1142 obtains an indication that a delivery confirmation has been received (e.g., from the circuit/module for receiving a confirmation 1140). The circuit/module for clearing memory 1142 then identifies the memory locations that store the data for the devices that are the subject of the confirmation. The circuit/module for clearing memory 1142 then overwrites or otherwise clears these locations in the memory device 1108.

As mentioned above, programming stored by the storage medium 1104, when executed by the processing circuit 1110, causes the processing circuit 1110 to perform one or more of the various functions and/or process operations described herein. For example, the programming, when executed by the processing circuit 1110, may cause the processing circuit 1110 to perform the various functions, steps, and/or processes described herein with respect to FIGS. 1-10 and 12-18 in various implementations. As shown in FIG. 11, the storage medium 1104 may include one or more of the code for receiving 1144, the code for sending a page 1146, the code for aggregating data 1148, the code for sending data 1150, the code for synchronizing 1152, a circuit/module for determining time slots 1154, the code for triggering the sending of data 1156, the code for identifying a cell 1158, the code for associating an identifier with aggregated data 1160, the code for establishing a connection 1162, the code for receiving a confirmation 1164, or the code for clearing memory 1166.

Example Processes

Figure 12:
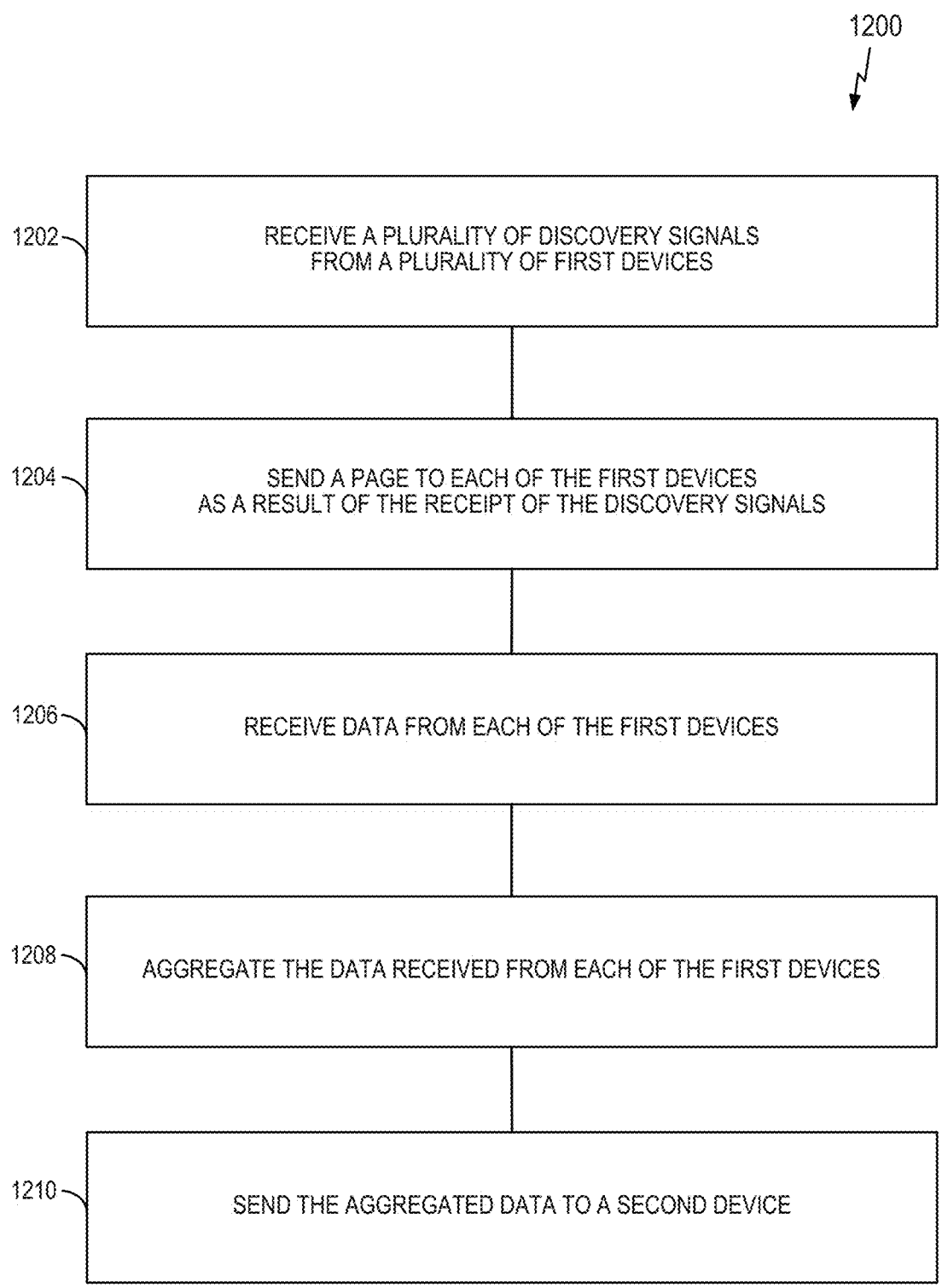
FIG. 12 illustrates an example of a process for communication in accordance with some aspects of the disclosure.

FIG. 12 illustrates a process 1200 for communication in accordance with some aspects of the disclosure. The process 1200 may take place within a processing circuit (e.g., the processing circuit 1110 of FIG. 11), which may be located in a relay device (e.g., a UE, etc.) or some other suitable apparatus. Of course, in various aspects within the scope of the disclosure, the process 1200 may be implemented by any suitable apparatus capable of supporting aggregation and relaying operations (e.g., a mobile device, an M2M device, an MTC device, a base station, etc.).

At block 1202, an apparatus (e.g., a relay device) receives a plurality of discovery signals from a plurality of first devices. For example, a first discovery signal may be received from a first device at a first point in time (e.g., a designated time slot), a second discovery signal received from a second device at a second point in time (e.g., another designated time slot), and so forth. As another example, a first discovery signal may be received from the first device via a first resource (e.g., a first frequency band), a second discovery signal received from the second device via a second resource (e.g., a second frequency band), and so forth.

In some aspects, each of the first devices may be at least one of: a machine-to-machine (M2M) communication device, a machine type communication (MTC) device, a sensor device, a low power device, a battery operated device, a device that includes a radiofrequency (RF) amplifier that has lower RF transmit power than a relay device that uploads the aggregated data to a WAN, or a device that employs (e.g., only employs) narrow frequency bandwidth communication, a device that is configured to consume less power than the apparatus, or a device that uses a first frequency bandwidth for communication that is narrower than a second frequency bandwidth used for sending the aggregated data (e.g., a device that uses a first frequency bandwidth to receive the data from each of the first devices and uses a second frequency bandwidth to send the aggregated data to the second device, wherein the first frequency bandwidth is narrower than the second frequency bandwidth).

At block 1204, as a result of receiving the discovery signals at block 1202, the apparatus sends a page to each of the first devices. For example, the apparatus may send a page to a first device in response to receiving a discovery signal from the first device, the apparatus may send a page to a second device in response to receiving a discovery signal from the second device, and so on. Each of the pages may be sent using a corresponding resource (e.g., different pages are sent during different time slots and/or via different frequency bands). As discussed herein, one or more pages may be sent. For example, a group page may be sent or a corresponding page may be sent for each device.

At block 1206, the apparatus receives data from each of the first devices (e.g., in response to the paging of block 1204). For example, the apparatus may receive data from a first one of the first devices. In some aspects, this data may be received in response to a page sent to that device. In addition, the apparatus may receive data from a second one of the first devices (e.g., in response to a page sent to that device), and so on. Each set of data may be received using a corresponding resource (e.g., the apparatus may receive the data from different devices during different time slots and/or via different frequency bands).

In some aspects, for each of the first devices, the data received from the first device includes at least one of: an indication of a source of the data, a source identifier (e.g., a sensor ID), a source address, a name of the source (source name), an indication of a destination for the data, a destination address, integrity information, encryption information, authentication information, or a time stamp.

In some scenarios, the above communication (i.e., discovery, paging, data receipt) with different devices occurs sequentially. For example, the apparatus may communicate with a first device, then a second device, and so on. In other scenarios, the signaling may be interspersed. For example, the apparatus may receive discovery signals from a first device and a second device before the apparatus pages the first device. Also, some communication may occur concurrently (e.g., through the use of different frequency bands or coding).

In some aspects, communication between the apparatus and the first devices may involve the use of different frequency bands and/or different frequency bandwidths. In some aspects, different frequency bands are used to receive signals from and send signals to different ones of the first devices. For example, the apparatus may use a first frequency band to send signals to and receive signals from a first device, the apparatus may use a second frequency band to send signals to and receive signals from a second device, and so on. In some aspects, the receiving and paging for different ones of the first devices are via different frequency bands. For example, a first device may be allocated a first frequency band, a second device allocated a second frequency band, and so on.

In some aspects, the receiving and paging are via: a Long Term Evolution (LTE) direct link, a Bluetooth link, a ZigBee link, an ad-hoc network link, or a mesh network link.

At block 1208, the apparatus aggregates the data received from each of the first devices. For example, the apparatus may incorporate the data into a common (i.e., the same) message. As another example, the apparatus may incorporate the data into a set of messages to be sent over a common (i.e., the same) connection.

At block 1210, the apparatus sends the aggregated data to a second device. In some aspects, the sending of the aggregated data to the second device includes establishing a connection with a base station and delivering the aggregated data to the base station via the connection.

In some aspects, the apparatus receives a delivery confirmation in response to the sending of the aggregated data. In this case, as a result of receiving the delivery confirmation, the apparatus may clear memory used for storing the data received from the first devices.

Figure 13:
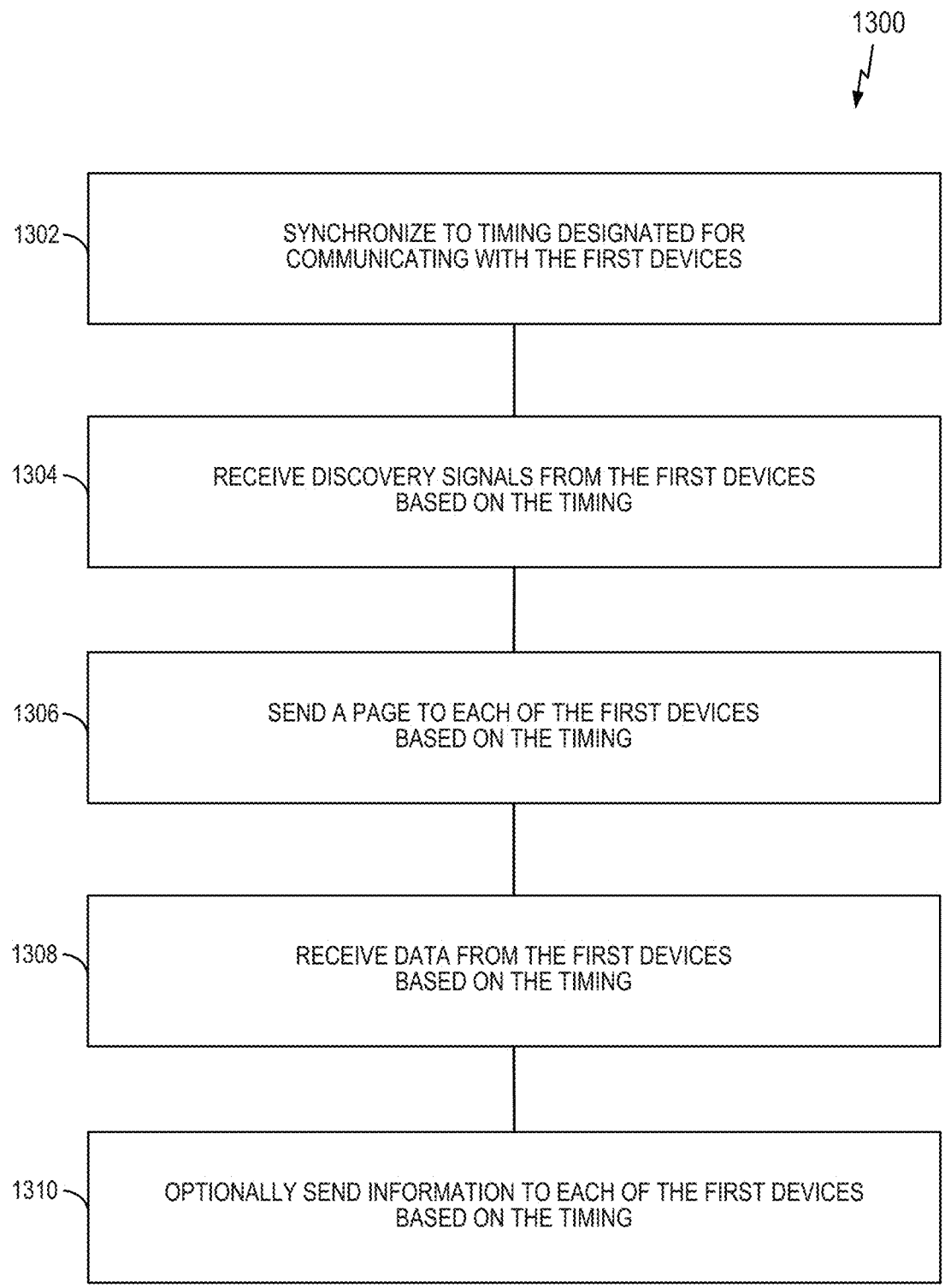
FIG. 13 illustrates an example of a process relating to device-to-device (D2D) communication in accordance with some aspects of the disclosure.

FIG. 13 illustrates a process 1300 for synchronizing timing in accordance with some aspects of the disclosure. In some aspects, the process 1300 may be performed in conjunction with the process 1200 of FIG. 12. The process 1300 may take place within a processing circuit (e.g., the processing circuit 1110 of FIG. 11), which may be located in a relay device (e.g., a UE, etc.) or some other suitable apparatus. Of course, in various aspects within the scope of the disclosure, the process 1300 may be implemented by any suitable apparatus capable of supporting aggregation and relaying operations (e.g., a mobile device, an M2M device, an MTC device, a base station, etc.).

In some implementations, the manner in which communication with the devices occurs depends on timing designated for the devices (e.g., predefined timing, timing designated by a WAN, timing designated by a base station, and so on). In this case, the reception from and the paging of the first devices may be based on this timing.

At block 1302, an apparatus (e.g., a relay device) synchronizes to timing designated for communicating with first devices. For example, the apparatus may synchronize to timing of designated time slots.

At block 1304, the apparatus receives discovery signals from the first devices based on the timing. That is, the timing at which the discovery signals are received may be based on the synchronized timing from block 1302.

At block 1306, the apparatus sends a page to each of the first devices based on the timing. That is, the timing at which the apparatus sends the pages may be based on the synchronized timing from block 1302.

At block 1308, the apparatus receives data from the first devices based on the timing. That is, the timing at which the apparatus receives data may be based on the synchronized timing from block 1302.

At optional block 1310, the apparatus may send information to each of the first devices, whereby the timing at which the apparatus sends the information may be based on the synchronized timing from block 1302.

Figure 14:
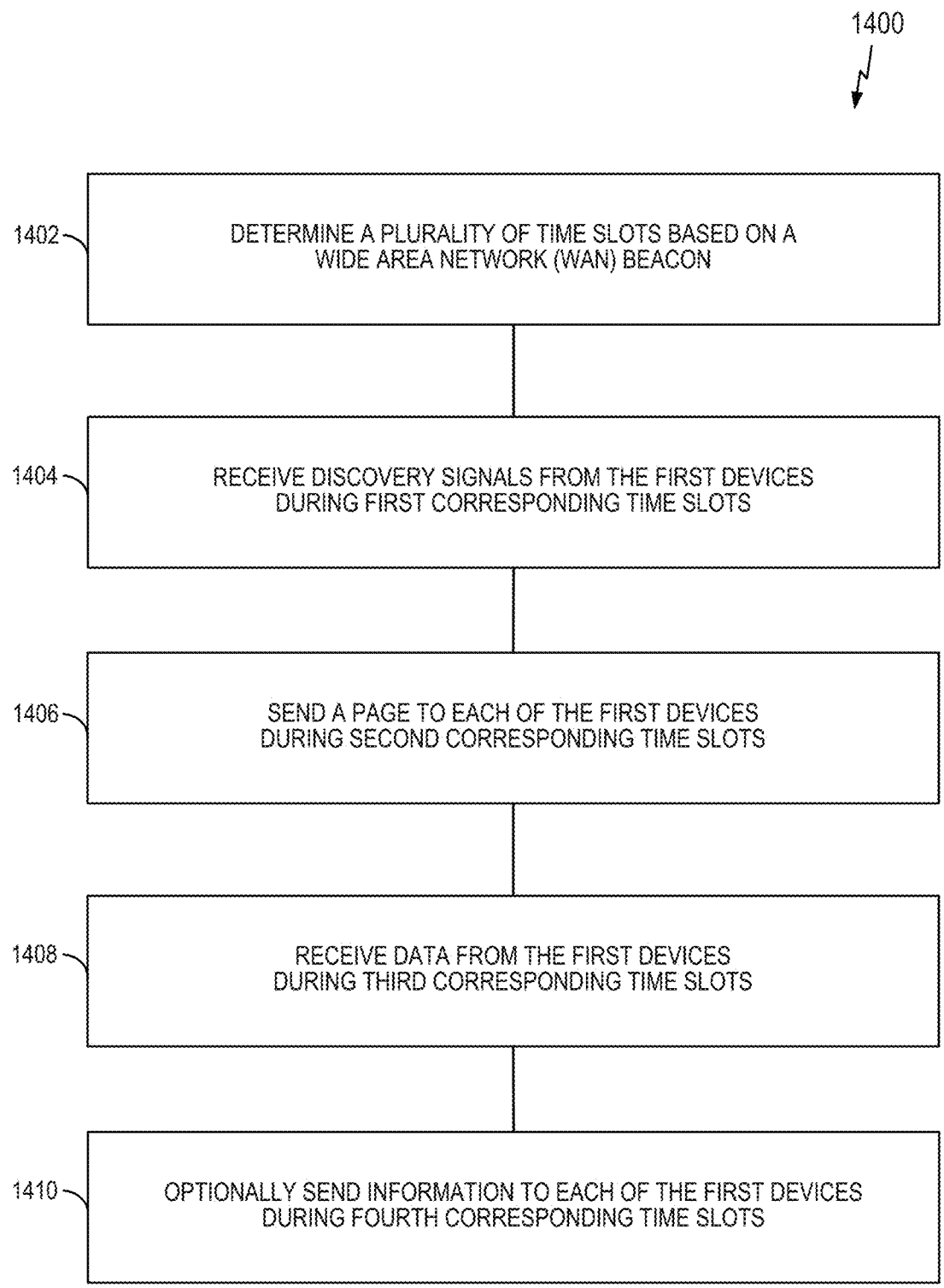
FIG. 14 illustrates another example of a process relating to device-to-device (D2D) communication in accordance with some aspects of the disclosure.

FIG. 14 illustrates a process 1400 for using time slots in accordance with some aspects of the disclosure. In some aspects, the process 1400 may be performed in conjunction with the process 1200 of FIG. 12. The process 1400 may take place within a processing circuit (e.g., the processing circuit 1110 of FIG. 11), which may be located in a relay device (e.g., a UE, etc.) or some other suitable apparatus. Of course, in various aspects within the scope of the disclosure, the process 1400 may be implemented by any suitable apparatus capable of supporting aggregation and relaying operations (e.g., a mobile device, an M2M device, an MTC device, a base station, etc.).

In some implementations, the timing for the communication with the devices is specified by time slots broadcast via WAN beacons. In this case, the reception from and the paging of the first devices may occur during corresponding time slots of the plurality of time slots. For example, different time slots may be designated for synchronization signals for different devices, different time slots may be designated for paging different devices, different time slots may be designated for data transmission by different devices, and so on.

At block 1402, an apparatus (e.g., a relay device) determines a plurality of time slots based on a wide area network beacon. For example, the apparatus may determine the timing of the time slots and/or identifiers of the time slots.

At block 1404, the apparatus receives discovery signals from first devices during first corresponding time slots. In some aspects, the receipt of the discovery signals at block 1202 of FIG. 12 may involve the apparatus receiving a first discovery signal from a first one of the first devices via a first time slot and receiving a second discovery signal from a second one of the first devices via a second time slot.

At block 1406, the apparatus sends a page to each of the first devices during second corresponding time slots. In some aspects, the paging at block 1204 of FIG. 12 may involve the apparatus paging the first one of the first devices via a third time slot and paging the second one of the first devices via a fourth time slot.

At block 1408, the apparatus receives data from the first devices during third corresponding time slots. In some aspects, the receipt of the data at block 1206 of FIG. 12 may involve receiving first data from the first one of the first devices via a fifth time slot and receiving second data from the second one of the first devices via a sixth time slot.

At optional block 1410, the apparatus may send information sent to each of the first devices, whereby the time slots in which the apparatus sends the information may be based on the time slots determined at block 1402.

Figure 15:
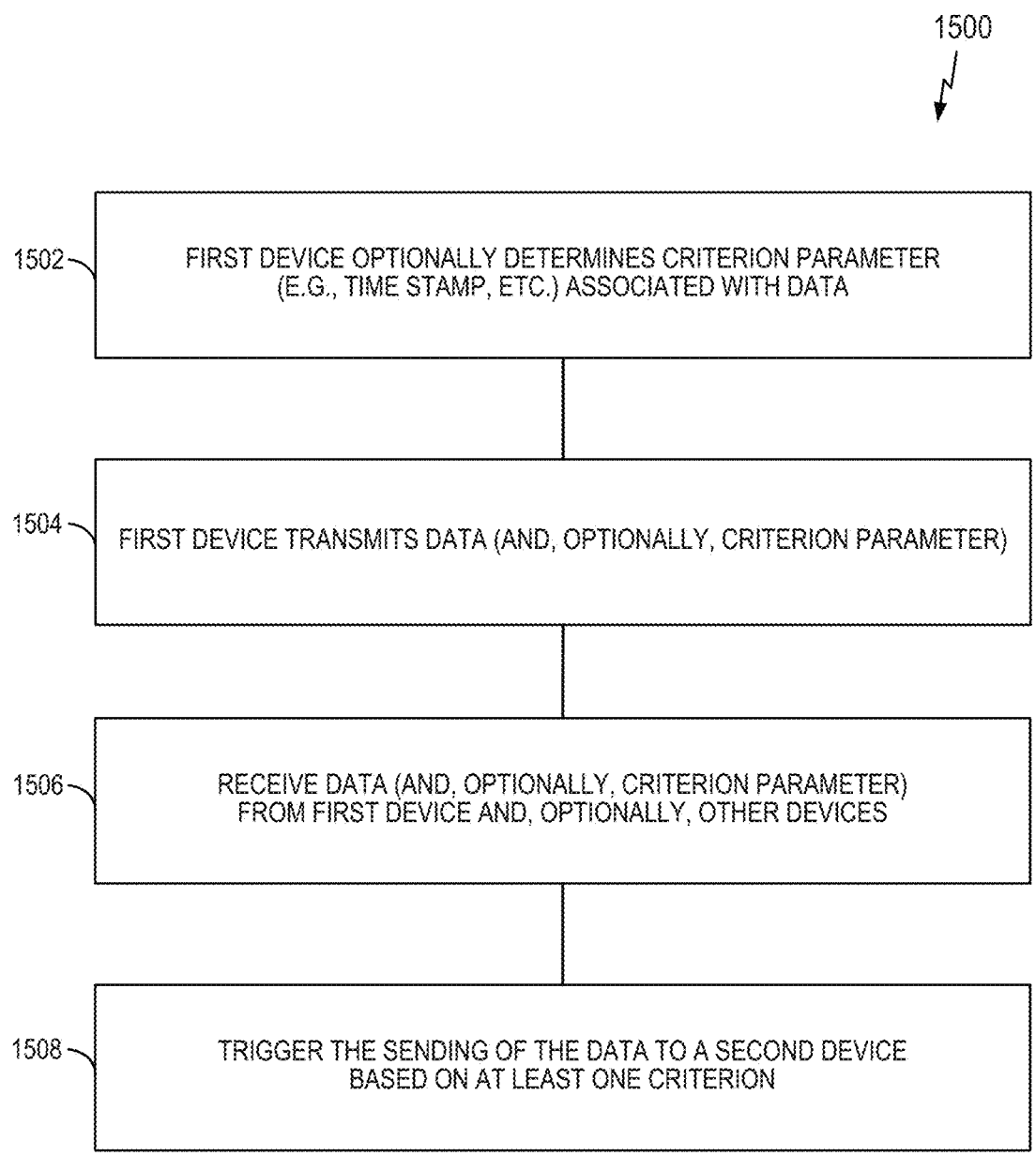
FIG. 15 illustrates an example of a process relating to triggering the sending of data in accordance with some aspects of the disclosure.

FIG. 15 illustrates a process 1500 for triggering the sending of data in accordance with some aspects of the disclosure. In some aspects, the process 1500 may be performed in conjunction with the process 1200 of FIG. 12. The process 1500 may take place within a processing circuit (e.g., the processing circuit 1110 of FIG. 11), which may be located in one or more of a relay device (e.g., a UE, etc.), and MTC device, or some other suitable apparatuses. Of course, in various aspects within the scope of the disclosure, the process 1500 may be implemented by any suitable apparatus capable of supporting aggregation and relaying operations (e.g., a mobile device, an M2M device, an MTC device, a base station, etc.).

In some aspects, the sending of aggregated data to a second device is triggered based on at least one criterion. For example, an apparatus may be configured to employ a trigger based on at least one criterion to send aggregated data to a second device. In some aspects, the at least one criterion may include at least one of: a designated transmission periodicity, a quantity of stored data corresponding to the data received from the first devices, a quantity of memory storage available for storing the data received from the first devices, establishment of a connection to the second device (e.g., for other traffic), or timing information (e.g., an expiry time) associated with the data received from at least one of the first devices.

At optional block 1502, a first device (e.g., an MTC device) may determine a criterion parameter associated with data. This parameter may include, for example, a time stamp or some indication of an expiry time for the data.

At block 1504, each first device transmits its data (along with the criterion parameter, if applicable).

At block 1506, an apparatus (e.g., a relay device) receives the data (and, optionally, criterion parameters) transmitted by different first devices (e.g., MTC devices) at block 1504.

At block 1508, the sending of aggregated data from the apparatus to a second device (e.g., a base station) is triggered based on at least one criterion (e.g., as set forth above).

Figure 16:
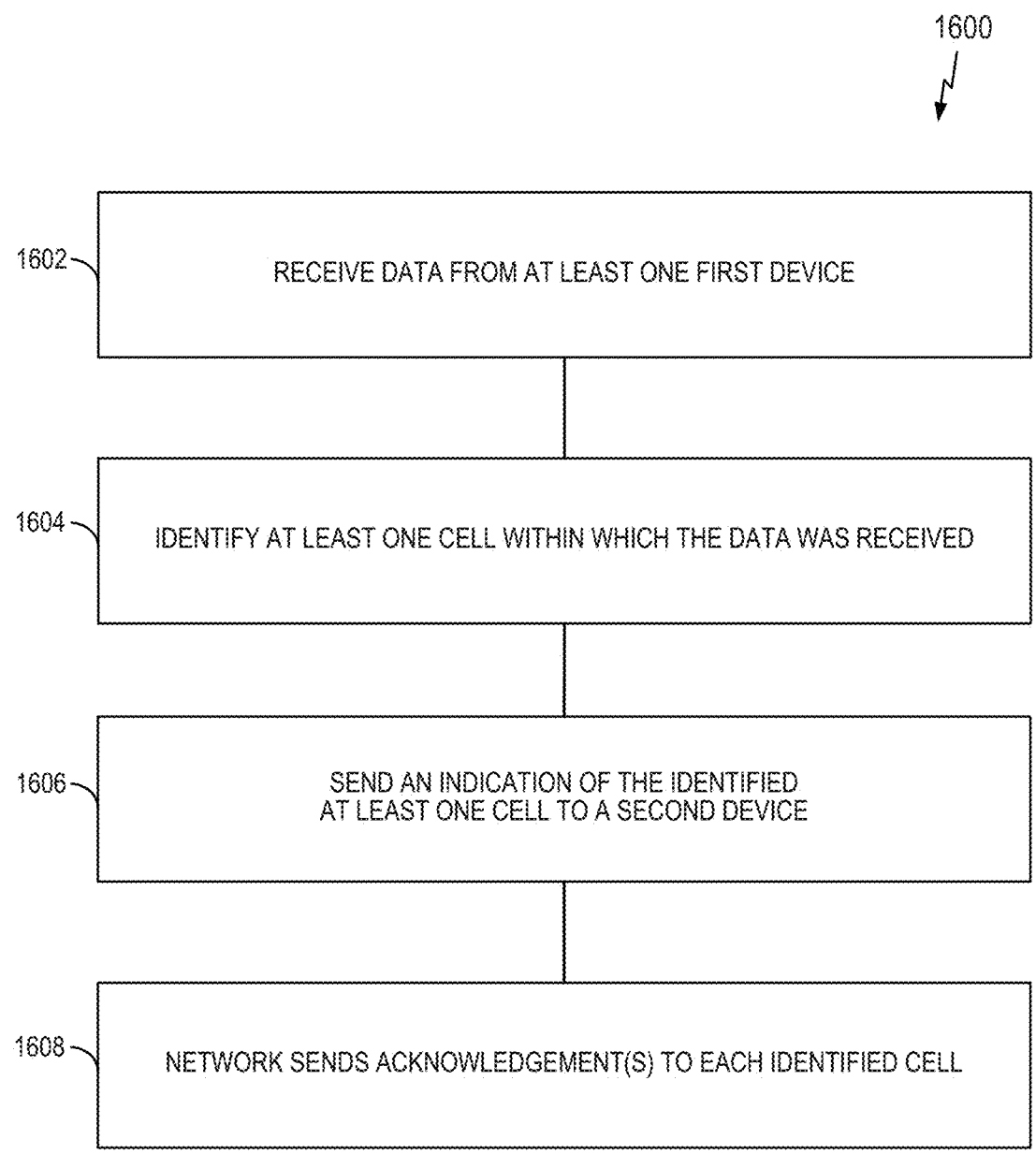
FIG. 16 illustrates an example of a process relating to indicating a cell in accordance with some aspects of the disclosure.

FIG. 16 illustrates a process 1600 for identifying a cell in accordance with some aspects of the disclosure. In some aspects, the process 1600 may be performed in conjunction with the process 1200 of FIG. 12. The process 1600 may take place within a processing circuit (e.g., the processing circuit 1110 of FIG. 11), which may be located in a relay device (e.g., a UE, etc.), a network entity (e.g., a base station), or some other suitable apparatuses. Of course, in various aspects within the scope of the disclosure, the process 1600 may be implemented by any suitable apparatus capable of supporting aggregation and relaying operations (e.g., a mobile device, an M2M device, an MTC device, a base station, etc.).

In some aspects, the process 1200 may involve identifying the cell that a device was in when it received data from the first devices.

At block 1602, an apparatus (e.g., a relay) receives data from at least one first device (e.g., an MTC device).

At block 1604, the apparatus identifies at least one cell within which the data from the first devices was received.

At block 1606, the apparatus sends an indication of the identified at least one cell to the second device along with the aggregated data.

At block 1608, the network sends an acknowledgement to each cell that was identified by the indication.

Figure 17:
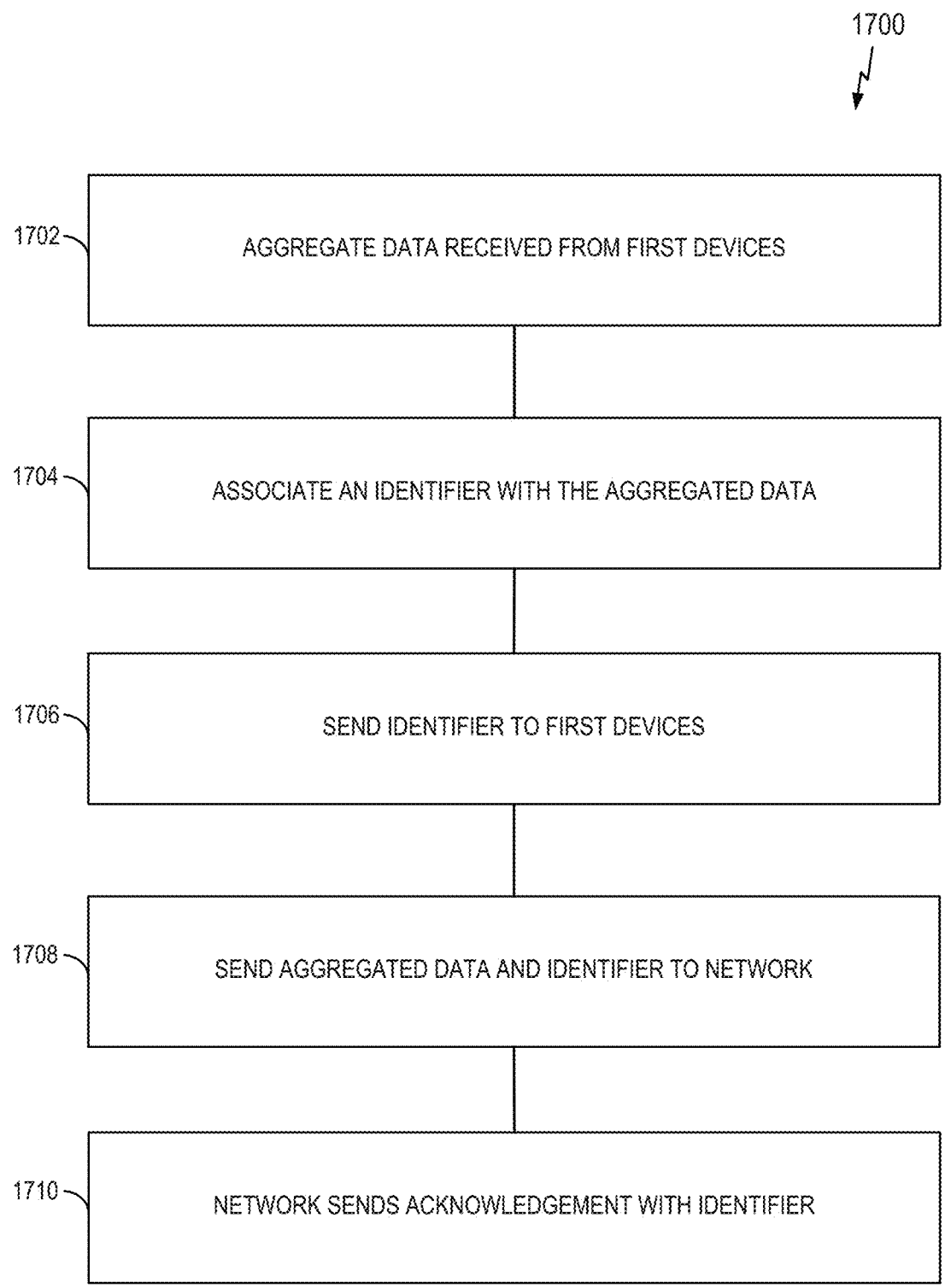
FIG. 17 illustrates an example of a process relating to identifying aggregated data in accordance with some aspects of the disclosure.

FIG. 17 illustrates a process 1700 for associating an identifier with data in accordance with some aspects of the disclosure. In some aspects, the process 1700 may be performed in conjunction with the process 1200 of FIG. 12. The process 1700 may take place within a processing circuit (e.g., the processing circuit 1110 of FIG. 11), which may be located in a relay device (e.g., a UE, etc.), a network entity (e.g., a base station), or some other suitable apparatuses. Of course, in various aspects within the scope of the disclosure, the process 1700 may be implemented by any suitable apparatus capable of supporting aggregation and relaying operations (e.g., a mobile device, an M2M device, an MTC device, a base station, etc.).

In some aspects, the process 1200 may involve assigning an identifier to aggregated data.

At block 1702, an apparatus (e.g., a relay device) aggregates data received from a plurality of first devices (e.g., MTC devices).

At block 1704, the apparatus associates an identifier (e.g., a batch ID) with the aggregated data.

At block 1706, the apparatus sends the identifier to the first devices.

At block 1708, the apparatus sends the identifier to the second device along with the aggregated data.

At block 1710, the network sends an acknowledgement that includes the identifier from block 1708.

Figure 18:
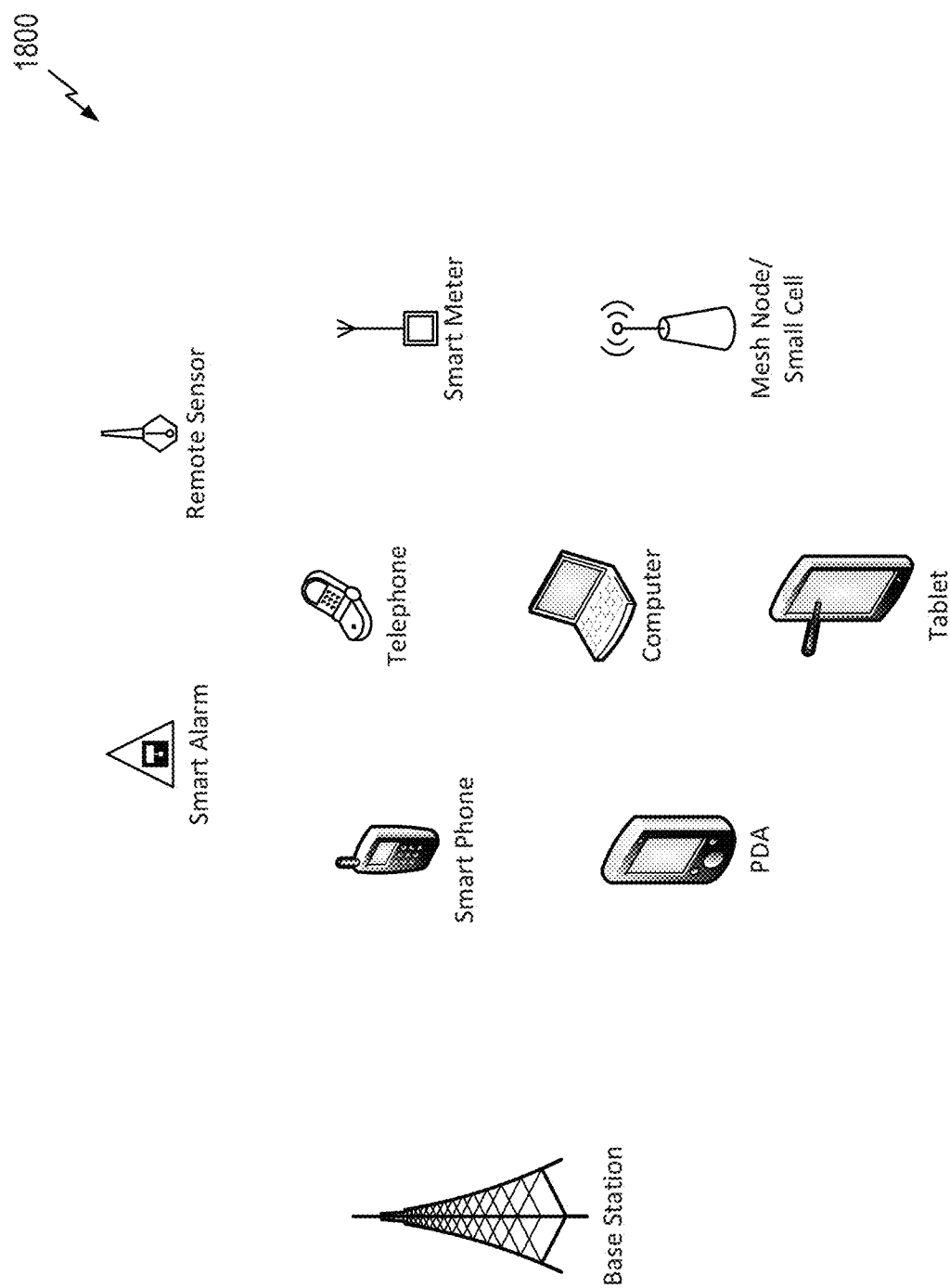
FIG. 18 illustrates an example of a wireless communication network within which aspects of the disclosure may be implemented.

FIG. 18 is a schematic illustration of a wireless communication network 1800 including multiple communication entities as it may appear in some aspects of the disclosure. As described herein, a scheduling entity or an entity being scheduled may reside in, or be a part of, a base station, a smart phone, a small cell, or other entity. Subordinate entities or mesh nodes may reside in, or be a part of, a smart alarm, a remote sensor, a smart phone, a telephone, a smart meter, a personal data assistant (PDA), a personal computer, a mesh node, and/or a tablet computer. Of course, the illustrated devices or components are merely exemplary in nature, and any suitable node or device may appear within a wireless communication network within the scope of the present disclosure.

Additional Aspects

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while example implementations may have been discussed herein as device, system, or method implementations, it should be understood that such example implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" or "one or more of" a list of items refers to any combination of those items, including single members. As an example, "at least one of: a, b, or c" is intended to cover: a; b; c; a and b; a and c; b and c; a, b and c; $2a$; $2b$; $2c$; $2a$ and $b$; a and $2b$, $2a$ and $2b$; and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A user equipment for relay communication, comprising:
a memory device; and
a processing circuit coupled to the memory device and configured to:
receive timing information from a base station of a wide area network,
determine a plurality of time slots that are allocated by the wide area network for direct device-to-device communication between a plurality of first devices, wherein the determination of the plurality of time slots allocated by the wide area network is based on the timing information received from the base station of the wide area network, and wherein the plurality of time slots allocated by the wide area network comprise discovery time slots, paging time slots, and data time slots,
receive a plurality of discovery signals from the plurality of first devices during at least a portion of the discovery time slots,
page the plurality of first devices during at least a portion of the paging time slots as a result of the receipt of the plurality of discovery signals,
receive data from at least two of the plurality of first devices during at least a portion of the data time slots,
aggregate the data received from the at least two of the plurality of first devices, and
send the aggregated data to a second device.

2. The user equipment of claim 1, wherein each of the plurality of first devices comprises at least one of: a machine-to-machine (M2M) communication device, a machine type communication (MTC) device, a sensor device, or a device that is configured to consume less power than the user equipment.

3. The user equipment of claim 1, wherein each of the plurality of first devices includes a radiofrequency (RF) amplifier that has lower RF transmit power than a relay device that uploads the aggregated data to the wide area network.

4. The user equipment of claim 1, further comprising a transceiver configured to:
use a first frequency bandwidth to receive the data from each of the at least two of the plurality of first devices; and
use a second frequency bandwidth to send the aggregated data to the second device,
wherein the first frequency bandwidth is narrower than the second frequency bandwidth.

5. The user equipment of claim 1, wherein the processing circuit is further configured to:
synchronize to beacon timing of the wide area network;
receive the plurality of discovery signals and the data from the at least two of the plurality of first devices based on the beacon timing; and
send a page to each of the at least two of the plurality of first devices based on the beacon timing.

6. The user equipment of claim 1, wherein the processing circuit is further configured to:
receive a first discovery signal from a first one of the plurality of first devices via a first time slot of the discovery time slots and receive a second discovery signal from a second one of the plurality of first devices via a second time slot of the discovery time slots;
send a first page to the first one of the plurality of first devices via a third time slot of the paging time slots and send a second page to the second one of the plurality of first devices via a fourth time slot of the paging time slots; and
receive first data from the first one of the plurality of first devices via a fifth time slot of the data time slots and receive second data from the second one of the plurality of first devices via a sixth time slot of the data time slots,
wherein the paging time slots are pre-allocated with respect to the discovery time slots.

7. The user equipment of claim 1, wherein the processing circuit is further configured to employ a trigger based on at least one criterion to send the aggregated data to the second device.

8. The user equipment of claim 7, wherein the at least one criterion comprises at least one of: a designated transmission periodicity, a quantity of stored data corresponding to the data received from the plurality of first devices, a quantity of memory storage available for storing the data received from the plurality of first devices, establishment of a connection to the second device, or timing information associated with the data received from at least one of the at least two of the plurality of first devices.

9. The user equipment of claim 1, wherein the processing circuit is further configured to:
identify at least one cell within which the data from the at least two of the plurality of first devices was received; and
send an indication of the identified at least one cell to the second device.

10. The user equipment of claim 1, wherein the processing circuit is further configured to:
associate an identifier with the aggregated data; and
send the identifier to the second device.

11. The user equipment of claim 1, wherein the data received from the at least two of the plurality of first devices comprises at least one of: an indication of a source of the data, a source identifier, a source address, a source name, an indication of a destination for the data, a destination address, integrity information, encryption information, authentication information, or a time stamp.

12. The user equipment of claim 1, wherein, to send the aggregated data to the second device, the processing circuit is further configured to:
establish a connection with the base station; and
send the aggregated data to the base station via the connection.

13. The user equipment of claim 1, wherein the processing circuit is further configured to:
receive a delivery confirmation in response to the aggregated data being sent; and clear memory used for storing the data received from the at least two of the plurality of first devices as a result of the receipt of the delivery confirmation.

14. The user equipment of claim 1, further comprising a communication interface configured to:
receive the plurality of discovery signals and the data from the at least two of the plurality of first devices via: a Long Term Evolution (LTE) direct link, a Bluetooth link, a ZigBee link, an ad-hoc network link, or a mesh network link; and
send a page to each of the plurality of first devices via: the Long Term Evolution (LTE) direct link, the Bluetooth link, the ZigBee link, the ad-hoc network link, or the mesh network link.

15. The user equipment of claim 1, further comprising a communication interface configured to use different frequency bands to receive signals from and send signals to different ones of the plurality of first devices.

16. A method of relay communication for a user equipment, comprising:
receiving timing information from a base station of a wide area network;
determining a plurality of time slots that are allocated by the wide area network for direct device-to-device communication between a plurality of first devices, wherein the determination of the plurality of time slots allocated by the wide area network is based on the timing information received from the base station of the wide area network, and wherein the plurality of time slots allocated by the wide area network comprise discovery time slots, paging time slots, and data time slots;
receiving a plurality of discovery signals from the plurality of first devices during at least a portion of the discovery time slots;
page the plurality of first devices during at least a portion of the paging time slots as a result of the receipt of the plurality of discovery signals;
receiving data from at least two of the plurality of first devices during at least a portion of the data time slots;
aggregating the data received from the at least two of the plurality of first devices; and
sending the aggregated data to a second device.

17. The method of claim 16, wherein each of the plurality of first devices comprises at least one of: a machine-to-machine (M2M) communication device, a machine type communication (MTC) device, a sensor device, a device that is configured to consume less power than the user equipment, a battery operated device, a device that includes a radiofrequency (RF) amplifier that has lower RF transmit power than a relay device that uploads the aggregated data to the wide area network, or a device that uses a first frequency bandwidth for communication that is narrower than a second frequency bandwidth used for sending the aggregated data.

18. The method of claim 16, further comprising:
synchronizing to beacon timing of the wide area network, wherein the receiving of the plurality of discovery signals from the at least two of the plurality of first devices, the receiving of the data from the at least two of the plurality of first devices, and the paging of the plurality of first devices are each based on the beacon timing.

19. The method of claim 16, wherein:
the receiving of the plurality of discovery signals comprises receiving a first discovery signal from a first one of the plurality of first devices via a first time slot of the discovery time slots and receiving a second discovery signal from a second one of the plurality of first devices via a second time slot of the discovery time slots;
the paging of the plurality of first devices comprises sending a first page to the first one of the plurality of first devices via a third time slot of the paging time slots and sending a second page to the second one of the plurality of first devices via a fourth time slot of the paging time slots; and
the receiving of the data comprises receiving first data from the first one of the plurality of first devices via a fifth time slot of the data time slots and receiving second data from the second one of the plurality of first devices via a sixth time slot of the data time slots,
wherein the paging time slots are pre-allocated with respect to the discovery time slots.

20. The method of claim 16, further comprising triggering, based on at least one criterion, the sending of the aggregated data to the second device.

21. The method of claim 16, further comprising:
identifying at least one cell within which the data from the at least two of the plurality of first devices was received; and
sending an indication of the identified at least one cell to the second device.

22. The method of claim 16, further comprising:
associating an identifier with the aggregated data; and
sending the identifier to the second device.

23. The method of claim 16, wherein the sending of the aggregated data to the second device comprises:
establishing a connection with the base station; and
delivering the aggregated data to the base station via the connection.

24. The method of claim 16, further comprising:
receiving a delivery confirmation in response to the sending of the aggregated data; and
clearing memory used for storing the data received from the at least two of the plurality of first devices as a result of the receipt of the delivery confirmation.

25. A user equipment for relay communication, comprising:
means for receiving timing information from a base station of a wide area network;
means for determining a plurality of time slots that are allocated by the wide area network for direct device-to-device communication between a plurality of first devices, wherein the determination of the plurality of time slots allocated by the wide area network is based on the timing information received from the base station of the wide area network, and wherein the plurality of time slots allocated by the wide area network comprise discovery time slots, paging time slots, and data time slots;
means for receiving a plurality of discovery signals from the plurality of first devices during at least a portion of the discovery time slots;
means for paging the plurality of first devices during at least a portion of the paging time slots as a result of the receipt of the plurality of discovery signals;
wherein the means for receiving is configured to receive data from at least two of the plurality of first devices during at least a portion of the data time slots;
means for aggregating the data received from the at least two of the plurality of first devices; and
means for sending the aggregated data to a second device.

26. The user equipment of claim 25, wherein:
the user equipment further comprises means for synchronizing to beacon timing of the wide area network;

the means for receiving is further configured to receive the plurality of discovery signals and the data from the at least two of the plurality of first devices based on the beacon timing; and the means for paging is configured to send a page to each of the at least two of the plurality of first devices based on the beacon timing.

27. A non-transitory computer-readable medium storing computer-executable code for a user equipment relay apparatus, including code to:

receive timing information from a base station of a wide area network;

determine a plurality of time slots that are allocated by the wide area network for direct device-to-device communication between a plurality of first devices, wherein the determination of the plurality of time slots allocated by the wide area network is based on the timing information received from the base station of the wide area network, and wherein the plurality of time slots allocated by the wide area network comprise discovery time slots, paging time slots, and data time slots;

receive a plurality of discovery signals from the plurality of first devices during at least a portion of the discovery time slots;

page the plurality of first devices during at least a portion of the paging time slots as a result of the receipt of the plurality of discovery signals;

receive data from at least two of the plurality of first devices during at least a portion of the data time slots;

aggregate the data received from the at least two of the plurality of first devices; and send the aggregated data to a second device.

28. The user equipment of claim 1, wherein:

the determination of the plurality of time slots comprises determining timing for the direct device-to-device communication; and the determination of the timing is based on a beacon for the wide area network.

29. The user equipment of claim 1, wherein the plurality of first devices comprise a plurality of user equipment devices.

30. The user equipment of claim 1, wherein the processing circuit is further configured to:

determine an amount of the aggregated data; and determine whether to send the aggregated data based on the amount of the aggregated data, wherein the sending of the aggregated data to a second device is based on the determination of whether to send the aggregated data.

* * * * *